April 30, 1963

E. I. ODELL 3,087,290

AUTOMATIC NAIL PROCESSOR AND PACKAGER

Filed Aug. 26, 1959

INVENTOR
EUGENE I. ODELL
BY *Price and Heneveld*
ATTORNEYS

April 30, 1963 E. I. ODELL 3,087,290
AUTOMATIC NAIL PROCESSOR AND PACKAGER
Filed Aug. 26, 1959 8 Sheets-Sheet 2

INVENTOR
EUGENE I. ODELL

BY
ATTORNEYS

April 30, 1963  E. I. ODELL  3,087,290
AUTOMATIC NAIL PROCESSOR AND PACKAGER
Filed Aug. 26, 1959  8 Sheets-Sheet 3

INVENTOR
EUGENE I. ODELL
BY
ATTORNEYS

April 30, 1963 E. I. ODELL 3,087,290
AUTOMATIC NAIL PROCESSOR AND PACKAGER
Filed Aug. 26, 1959 8 Sheets-Sheet 4

INVENTOR
EUGENE I. ODELL
BY Price and Heneveld
ATTORNEYS

April 30, 1963    E. I. ODELL    3,087,290
AUTOMATIC NAIL PROCESSOR AND PACKAGER
Filed Aug. 26, 1959    8 Sheets-Sheet 5

INVENTOR
EUGENE I. ODELL
BY
ATTORNEYS

April 30, 1963  E. I. ODELL  3,087,290
AUTOMATIC NAIL PROCESSOR AND PACKAGER
Filed Aug. 26, 1959  8 Sheets-Sheet 6

INVENTOR
EUGENE I. ODELL

BY *Price and Heneveld*

ATTORNEYS

April 30, 1963 E. I. ODELL 3,087,290
AUTOMATIC NAIL PROCESSOR AND PACKAGER
Filed Aug. 26, 1959 8 Sheets-Sheet 7

INVENTOR
EUGENE I. ODELL

BY

ATTORNEYS

INVENTOR
EUGENE I. ODELL

United States Patent Office 3,087,290
Patented Apr. 30, 1963

3,087,290
AUTOMATIC NAIL PROCESSOR AND PACKAGER
Eugene I. Odell, Grand Haven, Mich., assignor, by mesne assignments, to Stuart Otto, Westport, Conn.
Filed Aug. 26, 1959, Ser. No. 836,230
28 Claims. (Cl. 53—59)

This invention relates to a nail processor and packager, and more particularly to an automatic nail processor and packager.

The automatic nail processor and packager disclosed herein, receives the nails as they are discharged from the nail forming machine, and processes them completely, including packaging for wholesale or retail distribution. The nail as it leaves the nail forming machine has many burrs and sharp edges which must be removed before they can be used. Thus, the nails must be deburred or de-whiskered by some method. It is an object of this application to disclose a de-whiskerer for removing the burrs and sharp edges from the nails.

It is necessary during the formation of the nails that they come in contact with oils and greases. Therefore, the nails leave the nail forming machine in a greasy or oily state. Since the nail user does not want to handle greasy nails, the nails must be processed in some manner to remove this grease. It is a further object of this invention to show a means whereby the nails may be degreased.

Since nails are oftentimes exposed to the elements before and after use, and due to their physical properties, they are prone to rust readily. It is often as undesirable to the user to have to handle rusty nails as it is to handle greasy nails. Therefore, it is common practice to coat the nails with some type of protective coating to prevent rusting, since, rusting shortens the life and strength of the nails which is obviously undesirable. Also, the nails are coated so that they will adhere to the material into which they are nailed which prevents the nail from working loose, and gives better fastening characteristics when two objects are nailed together. Therefore, still another object of this invention is to show a means for coating nails.

The means of packaging nails in a compact manner has always been a problem. Due to the characteristic of nails to comingle and assume every conceivable position, it is required that packages be used of considerably larger dimension for a given number of nails, than would be necessary if the nails were aligned directly one upon another. However, it is economically infeasible to have workers align the nails in the packages merely for space saving reasons. Therefore, it is still another object of this invention to disclose a magnetic nail packager which will align the nails so that they may be packaged compactly.

Another object is to disclose a means of connecting the de-whiskerer, de-greaser, coater, and packaging unit together in such a manner that each operates automatically in a predetermined sequence.

A further object is to disclose a pre-weighing device which admits a predetermined weight of nails to the system to assist in maintaining an uninterrupted sequence of operation.

A further object of this application is to disclose a series of limit switches which will shut down the various components of the automatic nail packager and processor at various points, should the nails become jammed or excessive so as to prevent the proper sequence of operation.

Another object is to disclose a nail weighing device which assures that a given quantity of nails are packaged in each carton.

It is still another object of this application to show a system of conveyors which automatically convey the nails from work station to work station in the proper sequence.

These and other objects which may appear as this specification proceeds are achieved by this invention which shall be described with reference to the drawings wherein:

FIG. 13 is a fragmentary view of certain control switches taken along the plane XIII—XIII of FIG. 6.

Figure 1:
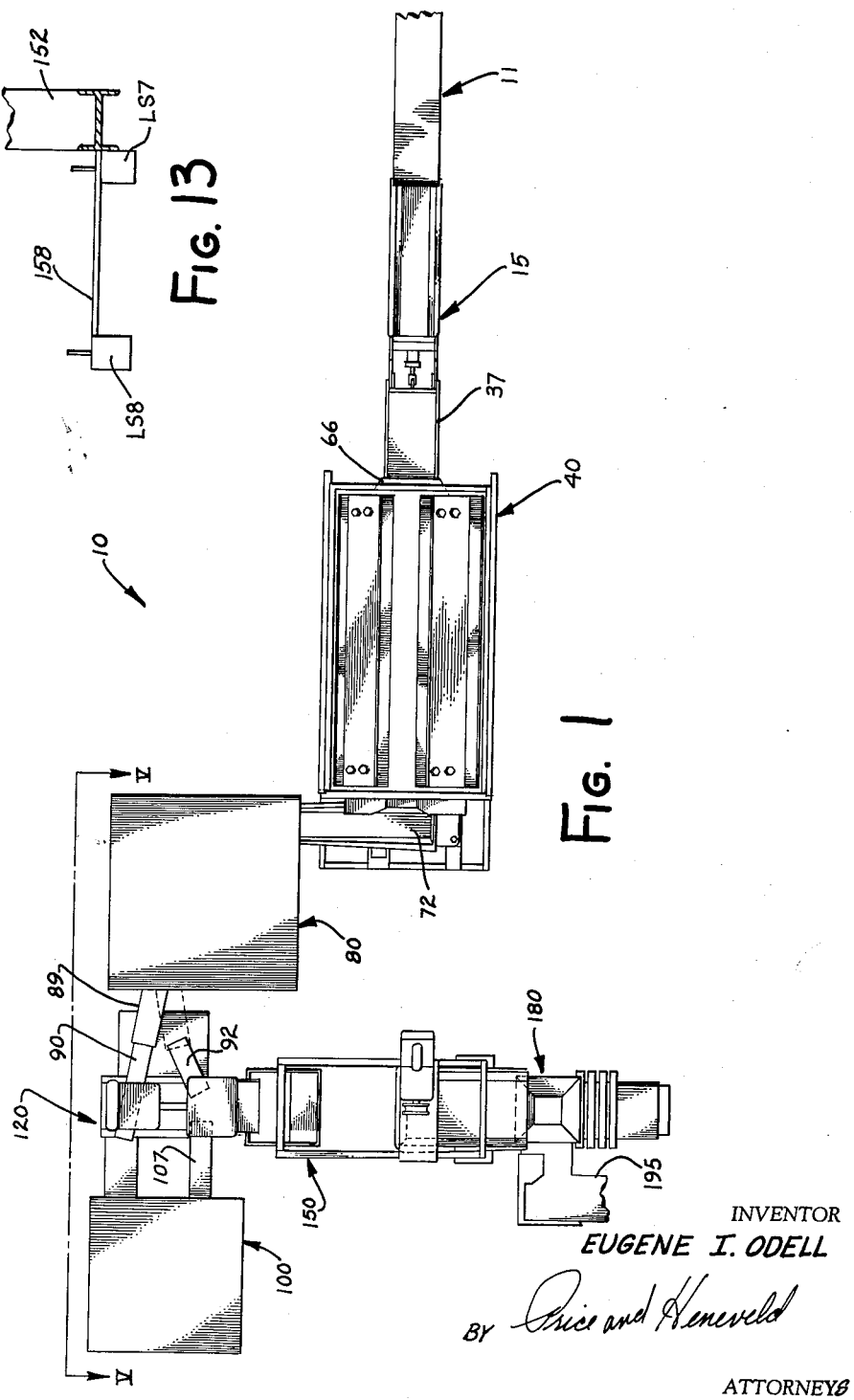
FIG. 1 is a plan view of the automatic nail processor and packager.

Referring to FIG. 1, the automatic nail processor and packager is composed of a magnetic nail conveyor 11 which conveys nails from a source of supply to the inlet of a pre-weigher 15. The pre-weigher 15 measures a predetermined quantity of nails and in timed sequence dumps the nails into a gravity chute which carries them to the inlet of a de-whiskerer unit 40. The de-whiskerer unit 40 knocks the burrs and sharp edges off the nails and discharges them into a conveyor which carries the nails to a de-greaser unit 80. The nails pass through the de-greaser 80 and are discharged onto a conveyor which transports them to the coater 100. In passing through the coater the nails are coated and dried and are then discharged onto a conveyor which carries them to the weigher unit 120. Weigher unit 120 weighs a predetermined quantity of nails, and dumps them into a skip hoist 150. The skip hoist 150 carries the nails from the weigher to the magnetic nail packager 180, wherein the nails are packaged.

Pre-Weigher

Figure 2:
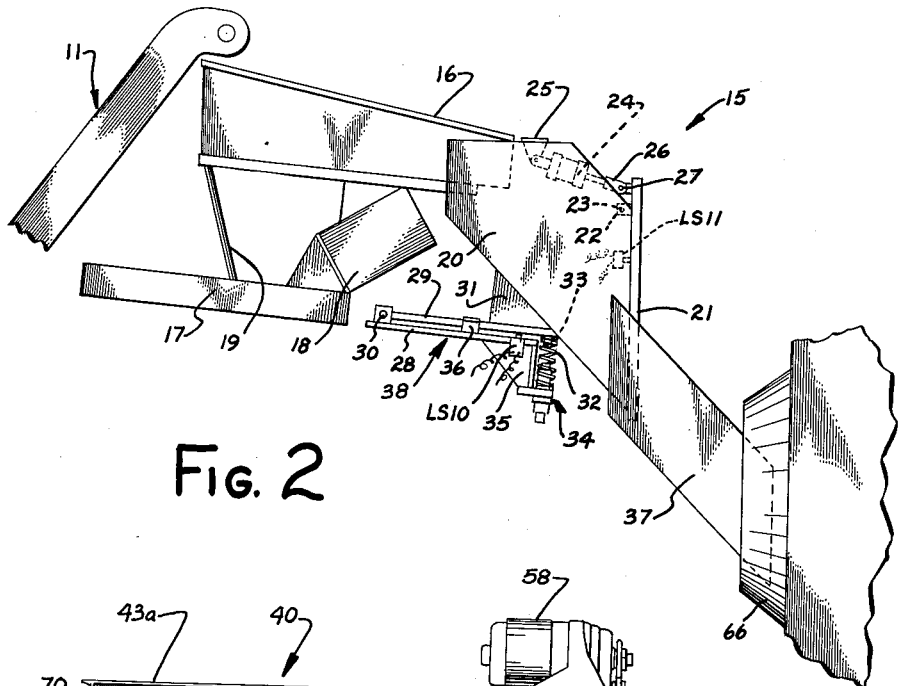
FIG. 2 is a side elevational view of the pre-weigher.

Referring specifically now to the components of the automatic nail processor and packager the first component in the system is the pre-weigher, designated generally as 15, and shown in detail in FIG. 2.

Figure 12B:
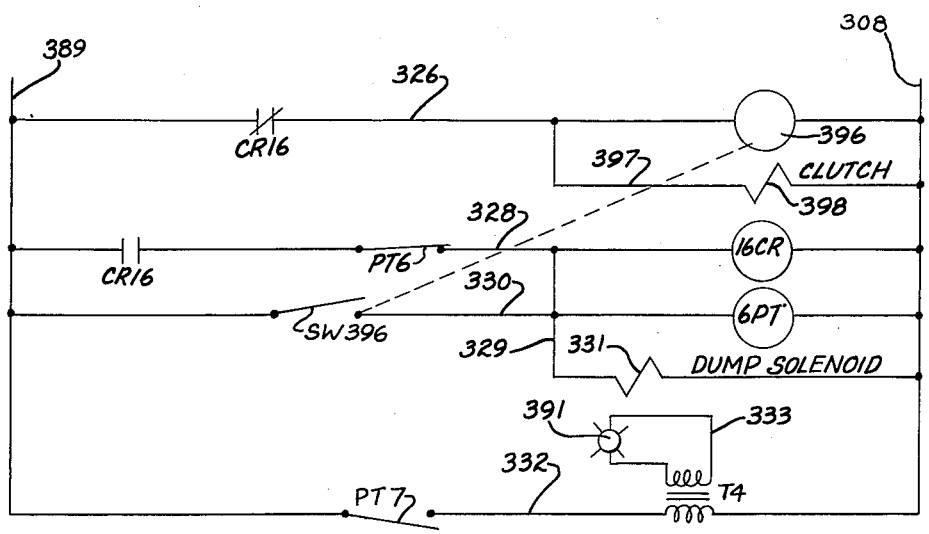
FIGS. 12, 12a, 12b and 12c are schematic electrical diagrams of the electrical circuit for controlling the automatic nail processor and packager.
Figures 12, 12C:
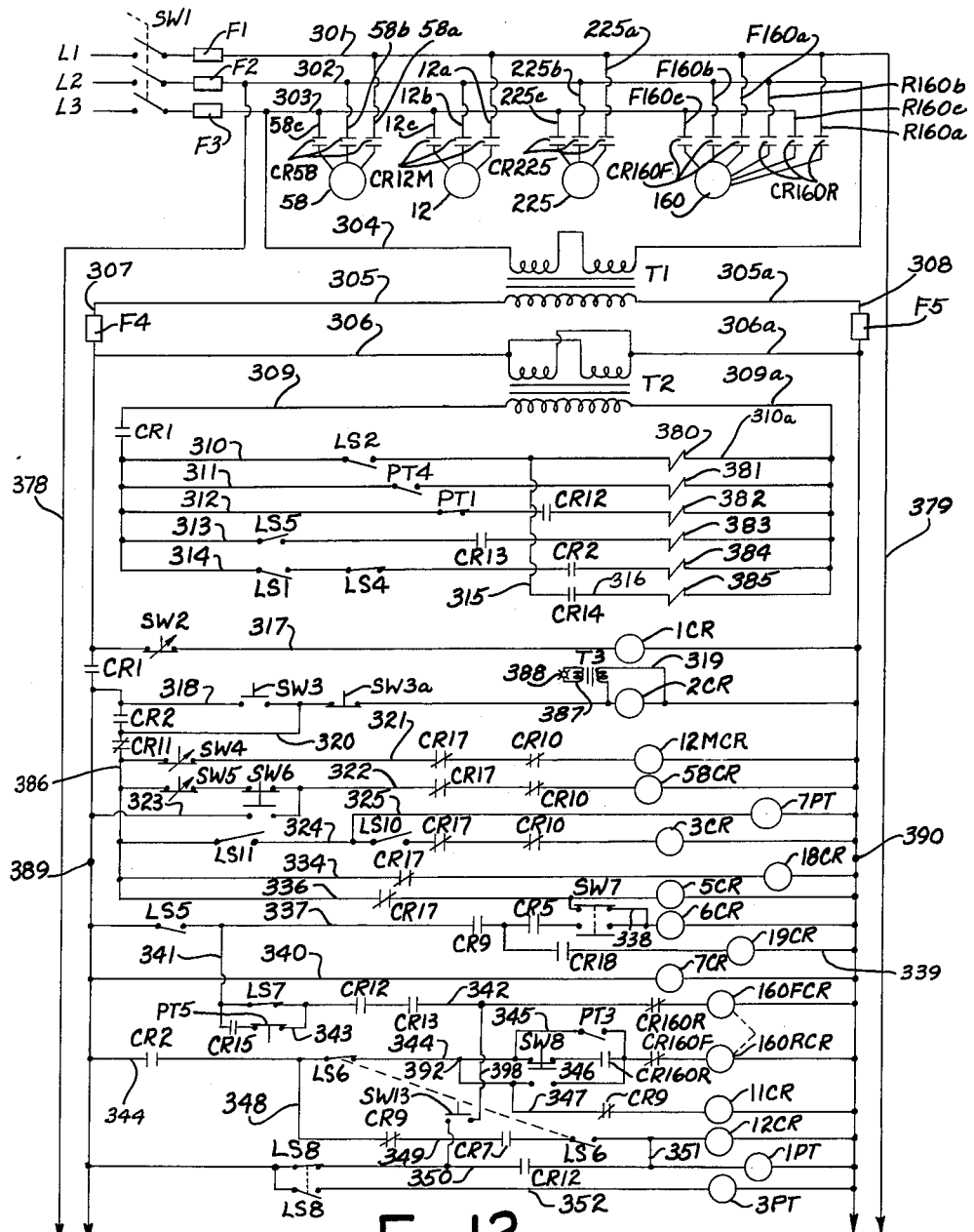

The pre-weigher 15 is fed by a magnetic-type conveyor 11 powered by a motor 12 shown schematically in FIG. 12. The magnetic conveyor 11 is of a conventional type which attracts the nails magnetically and carries them upwardly where the attraction is released causing the nails to drop. The nails drop into the chute 16 of a vibrating-type conveyor such as that sold under the trademark "Syntron" by the Syntron Company, Homer City, Pennsylvania. The Syntron is a vibrating-type conveyor composed of a vibrator 18, and a spring and support member 19. The vibrator 18 moves a conveying chute 16 carried thereby in one direction and the spring support 19 returns it to give a vibratory action to the chute 16. The vibrating mechanism is mounted on base 17 supported on a conventional type stand (not shown).

The chute 16 extends into a pre-weigher bucket 20 and discharges the nails into the bucket. The bottom of the bucket 20 is slanted at an angle of about 45° with respect to vertical, so that the nails discharged therein are gravity fed toward the trap door 21 of the bucket. The trap door 21 has brackets 23 which are pivotally mounted on a rod 22 which spans and extends through the sides of the weigh bucket. The trap door 21 assumes a vertical position and closes the one end of the pre-weigher bucket 20 preventing escape of the nails from the bucket. The trap door 21 is actuated by an air motor 24, having an actuator arm 26 which is pivotally connected to the door 21 at 27. The other end of the air motor is pivotally connected to a bracket 25 which is secured to the pre-weigher bucket 20. The trap door 21 is actuated at predetermined time intervals the operation of which will be described more fully hereinafter.

The bottom of the pre-weigher bucket 20 is secured to a rectangular shape weigh bucket support 31. The support 31 assumes the approximate shape of a 45°-45°-90° triangle, and the pre-weigher bottom 20 is secured to the hypotenuse of the triangular shaped member. The long leg or side of the member 31 is secured to the platform 29 of a scales generally 38. The scales platform 29 is pivotally connected at 30 to the scales base 28. The scales base 28 is secured to the same stand (not shown) as the base 17 of the Syntron. An adjustable spring tensioning member 34 is secured to the scales base 28 by a bracket 35. A spring guide 33 is secured to the scales platform 29 and is axially aligned with the adjustable spring tensioning member 34. A spiral-type rate spring 32 has one of its ends which slides over the spring guide 33 and abuts against the bottom side of the scales platform 29, and the other end engaging the adjustable spring tensioning member 34. Upon tensioning the spring 32 by the tensioner 34 the platform 29 and pre-weigher bucket 20 which is secured thereto is supported by the spring 32. The tensioning unit 34 is calibrated so that a given number of turns of the device applies a predetermined amount of pressure to the rate spring 32 which is measured in pounds. Therefore, the tensioning member 34 and the spring 32 can be adjusted to support, for example, thirty pounds of nails in the pre-weigher bucket 20. However, when more than thirty pounds of nails are in the bucket the weight spring 32 will yield, and the pre-weigher bucket 20, weigh bucket support 31 and scales platform 29 will move downwardly.

A limit switch LS10 is secured to the scales base 30 and is positioned with respect to the platform 29 of the scales, so that when the platform moves downwardly the limit switch is actuated. Upon actuation of the limit switch LS10 the vibrator 18 is de-energized. The operation of the limit switch LS10 and the air motor 24 will be described in detail hereinafter.

A limit switch LS11 is secured to the side of the pre-weigher 20 so as to have its plunger actuated by the opening and closing of the trap door 21. The purpose of the limit switch LS11 will be fully explained in the operation of the entire magnetic nail processor and packager.

*De-Whiskerer*

Figure 3:
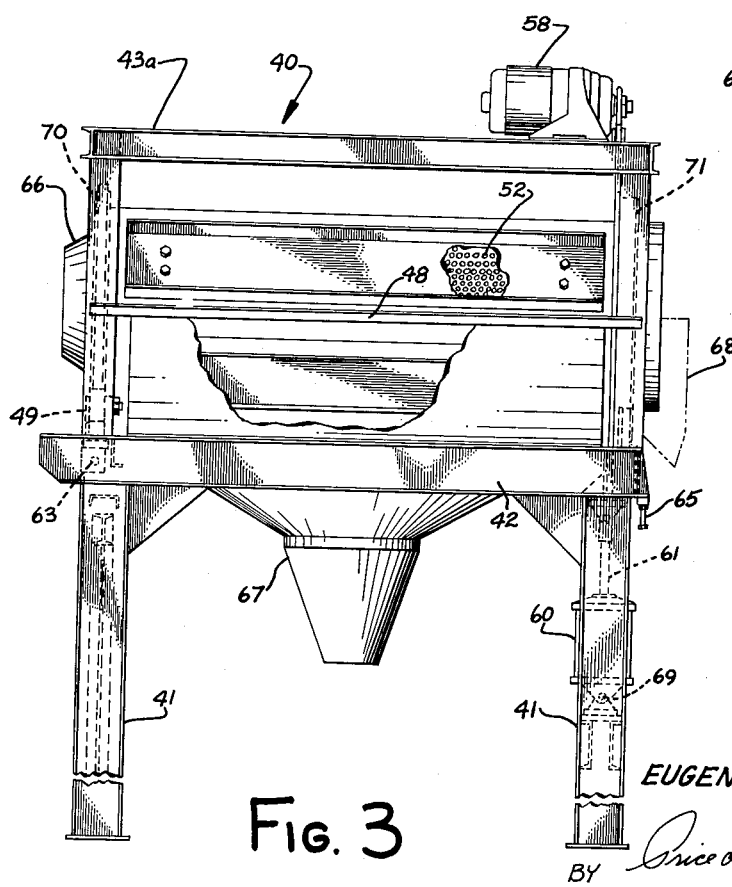
FIG. 3 is a side elevational view of the de-whiskerer.
Figure 4:
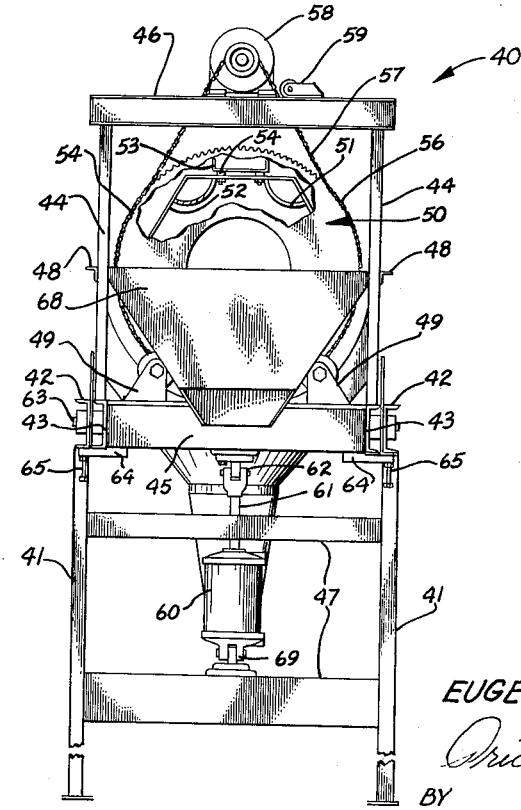
FIG. 4 is an end elevational view of the de-whiskerer.

When the trap door 21 of the pre-weigher bucket 20 is opened the nails are gravity fed by chute 37 into the de-whiskerer designated generally as 40. The de-whiskerer is best shown in FIGS. 3 and 4. The de-whiskerer not only serves to knock the burrs off but also has a primary function of separating previously loose burrs mingled with the nails.

Vertical legs 41 are tied together by horizontal support beams 42 and horizontal cross braces 47 to form a frame member for supporting the de-whisker drum 50.

A pair of longitudinally extending drum support beams 43 are pivotally mounted at one end of the horizontal support beams 42 to form a pivotal support means for drum 50. This support is formed by the longitudinal drum support beams 43 tied together by lower drum cross beams 45. One of the lower drum cross beams 45, located at the end opposite the pivotal connection 63 of the longitudinal drum support beams, is pivotally connected at 62 to the actuator rod 61 of an air motor 60 whose cylinder is pivotally connected at 69 to one of the cross braces 47. Upon actuation of the air motor 60 the pivotal drum support means formed by the longitudinal drum support beams 43 and cross beams 45 is pivoted upwardly about the pivotal connections 63.

Vertical drum support members 44 are secured to the longitudinal drum support beams and are tied together by upper drum cross beams 46 and upper longitudinal drum support beams 43a. This forms a rectangular shaped housing or framework for supporting the de-whiskerer drum 50 on the pivotal support means. Since the frame members 43a, 44 and 46 are secured to the longitudinal drum support beams 43, the entire framework and drum will pivot about the pivotal connection 63.

A pair of support and guide rollers 49, equally spaced from the vertical drum supports 44, are secured to the front lower drum cross beam 45 which is secured to air motor 60. Another pair of support guide rollers 49 are secured to the back lower drum cross beams 45 located adjacent the pivotal connection 63. The support and guide rollers 49 are in axial alignment. The front rollers engage the front drum support rings 71 and the back support and guide rollers 49 engage the rear drum support ring 70 of the drum 50. Thus, the drum 50 is supported by the guide rollers 49 for rotation with respect to the frame structure.

The drum 50 is an elongated hexagonal shaped member made of heavy gauge sheet metal. The rear drum support ring is secured to the body 50 of the drum adjacent its one end and provides a means of guiding and supporting the drum. The front drum support ring 71 is secured to the drum 50 adjacent the other end thereof, and guides and positions the drum as previously described. The front and rear drum support rings are circular in shape and therefore roll easily on the guide rollers 49. Secured to the drum 50 adjacent the drum ring support is a drive gear 56. The teeth of the drive gear 56 engage an endless chain which is trained over the drive gear of a motor 58 mounted on the front upper drum cross beam 46. The motor and drive gear are mounted to be axially aligned with the gear wheel 56 of the de-whiskerer drum so that a proper drive by the chain 57 may be had. A chain tensioner and positioner 59 is mounted on the cross beam 46 adjacent the motor 58, and engages the chain maintaining it in position and applying a tension necessary to take the whip out of the chain. Thus, upon actuation of the motor 58 the de-whiskerer drum 50 is rotated.

Spaced around the inner periphery of the hexagonal spaced de-whiskerer drum 50 are circular shaped drum tumblers positioned at the vertex of each angle of the hexagonal, and extending throughout the longitudinal length thereof. The circular shaped tumbler members serve the purpose of tumbling or moving the nails when the drum 50 is rotated. Each side wall portion of the hexagonal shaped drum which lies between the tumblers 51 is perforated throughout the longitudinal length of the de-whiskerer drum. The holes 52 are of a size to allow the burrs and sharp edges knocked off from the nails by the tumbling action to pass therethrough.

Secured to each side of the hexagonal shaped de-whiskerer drum 50 are baffles 53. The baffles are of a sufficient width so as to cover the perforations 52, and extend throughout the length of the drum 50. The baffles 53 are mounted on adjustable studs 54 which engage the sides of the drum 50. Thus, the baffles 53 can be adjusted so as to completely cover the perforations 52 or to a considerable distance away from the perforations. The baffles 53 are adjusted so as to allow the burrs and whiskers knocked from the nails to pass through the perforations 52 and between the baffles 53, however, they are also sufficiently close to the hexagonal surface of the drum 50 so as to prevent the entire nail from passing through the perforations and outside the inner periphery of the drum. Thus, when a nail seeks to pass through the perforation 52 the head or point of the nail strikes the baffle 53 and is directed back into the drum.

At either side of the de-whiskerer drum 50 and, secured to the vertical drum supports 44, at the approximate geometric center thereof, are longitudinal braces 48. The longitudinal braces 48 support a semi-circular shaped de-whiskerer chute 67. The chute 67 runs throughout the length of the de-whiskerer drum 50 and collects the burrs and whiskers that are knocked from the nails and sift through the perforations 52 and between the baffles 53. The chute 67 is formed so as to come to a funnel-like shape at its bottom, which directs the burrs and whiskers into a receptacle.

Secured to the front lower drum cross beam 45 are stop brackets 64. The stop brackets 64 extend from the lower edge of the beam 45 and longitudinal beams 43 transversely across the bottom edges of the horizontal support members 42. Thus, when the air motor 60 is actuated and the beam 45 moves upwardly, the stop brackets 64 prevent the beam 45 from assuming a vertical position which is above that of the horizontal supports 42, since the stop brackets 64 strike the bottom surfaces of the horizontal supports 42. However, if air motor 60 is actuated so as to move the front lower cross beam 45 downwardly, the longitudinal drum supports 43 pivot about the point 63 and the de-whiskerer drum 50, which is carried by the longitudinal drum supports and framework, is lowered accordingly. Thus, it can be seen that by actuation of the air motor 60 the front end of the de-whiskerer drum 50 can be placed lower than the back of the drum. Mounted within each stop bracket 64 are adjustable stop members 65. The stop members 65 are threaded members which are threaded through apertures in the stop brackets 64, and abut the bottom surface of the horizontal support members 42. Thus, when the adjustable stops 65 are threaded through the stop brackets 64 the longitudinal drum supports 43 and the mechanism mounted thereupon, can move upwardly upon actuation of the air motor 60, only until the ends of the adjustable stops 65 strike the bottom surface of the horizontal supports 42. If the adjustable stops 65 are threaded into the stop bracket 64 so as to extend even a small distance beyond the surface of the stop bracket 64, the front end of the de-whiskerer drum 50 will be lower than the end pivoted at 63. By proper adjustment of the adjustable stops 65, nails fed into the de-whiskerer 40 are gravity fed through the de-whiskerer 40 at a predetermined rate. The importance of this feature will be more fully described hereinafter. Once the adjustable stops 65 are adjusted so as to give the desired rate of flow through the de-whiskerer 40, they can be locked in position by appropriate lock nuts. Notice, that with this arrangement the actuating rod of the air motor 60 can be fully retracted and the front of the drum lowered considerably so at the end of the work day and when it is desirable to change the size of nails at the end of a run the de-whiskerer drum 50 can be readily emptied. When the air motor 60 is next actuated the adjustable stops 65 assure that the de-whiskerer drum 50 returns to the same position as it previously assumed. Thus, the gravity feed of the nails is the same as when previously regulated.

The gravity chute 37 which receives nails from the preweigher 15 extends into the cowl 66 of the de-whiskerer drum 50. The cowl 66 is secured to the back of the drum 50 adjacent the rear drum support ring 70. The nails move through the drum by gravity feed as just described, and are discharged from the de-whiskerer drum 50 into a discharge chute 68 which is secured to the longitudinal braces 48 and the front lower cross beam 45. The nails fall from the discharge chute 68 into a gravity-type conveyor 72 best shown in FIG. 1, which carries the nails to a de-greaser unit now to be described.

*De-Greaser*

Figure 5:
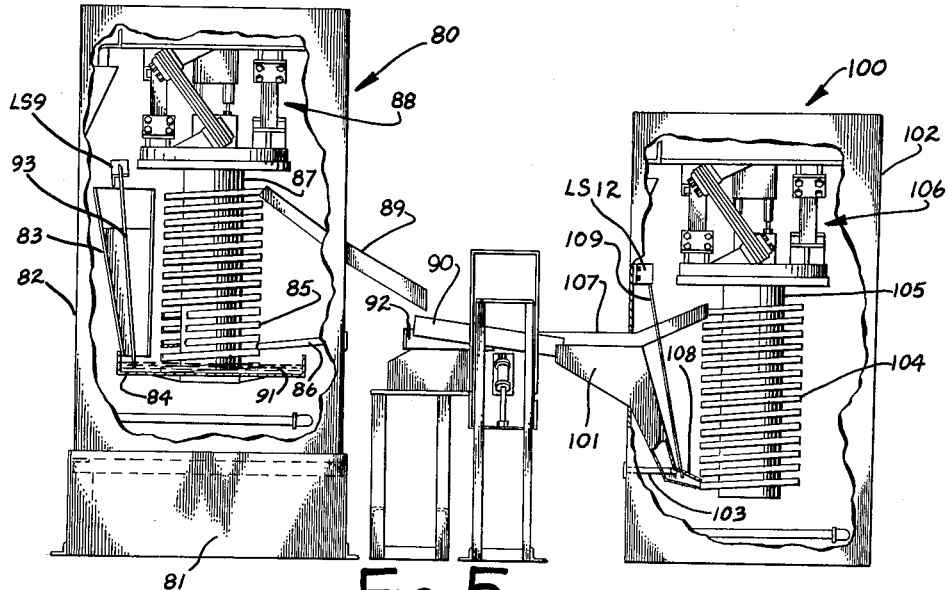
FIG. 5 is an elevational view of the de-greaser, coater and weigher looking in a direction of the arrows V—V of FIG. 1.

The de-greaser unit is best shown in FIG. 5, and is designated generally as 80. The basic de-greaser unit is one sold on the market under the trade name of Manpro by Manpro Corporation, Detroit 20, Michigan.

The de-greaser 80 has a square base 81 upon which an elongated similar type housing 82 is mounted and secured. Near the top of the de-greaser housing on one side thereof, is an opening and gravity chute 83 which receives nails from the conveyor 72. The incoming nails are conveyed by the chute 83 into a pan 84 containing some well known type of oil and grease solvent shown as 91. Suspended from the top of the de-greaser housing is vibrating mechanism shown generally as 88. The support column 87 extends downwardly from the vibrating mechanism, and supports the pan 84. Secured to the lower end of the support column 87 is a trough-like spiral conveyor chute which surrounds the support column 87, and spirals upwardly to the vicinity of the vibrating mechanism 88. When the vibrating mechanism 88 is actuated the column 87 and spiral conveyor 85 are vibrated causing the nails to spiral upwardly to the top of the spiral conveyor 85. Therefore, the nails pass through the solvent 91 and enter the conveyor 85 and pass through a vapor area immediately above the solvent, and are dried (by mechanism not shown) as they continue to travel to the apex of the conveyor 85. The top portion of the conveyor 85 discharges the nails into a gravity chute 89 which extends through the housing 82 and discharges the nails onto a vibrator conveyor 92. Thus, the nails enter the chute 83, pass through the solvent 91 and are dried as they are conveyed up the conveyor 85 and discharged from the de-greaser by the gravity chute 89.

A limit switch LS9 is disposed within the de-greaser in the vicinity of the chute 83, and near the top of the housing. The switch is disposed near the top of the housing to avoid the vapors around the solvent 91. A limit switch actuator 93 extends from the limit switch to a position near the top of the pan 84. The limit switch LS9 when actuated shuts down the flow of nails to the de-greaser so that the nails will not jam up in the chute or pan and prevent an even flow of nails. The operation of the limit switch LS9 will be explained in greater detail upon explaining the operation of the automatic nail processor and packager.

Conveyor 89 is pivotally mounted on the de-greaser so that it can feed into gravity chute 90 or optional feed 92 (FIG. 1). When conveyor 89 is feeding gravity chute 90 the nails are conveyed from the de-greaser to the coater. However, when conveyor 89 feeds optional feed 92 the nails are conveyed to the weigher 120. The operation of conveyor 89, gravity chute 90 and optional feed 92 will be explained in greater detail hereinafter in the operation of the devices.

*Coater*

The coater is best shown by FIG. 5, and is designated generally as 100. The coater is also sold under the trade name of Manpro, by the Manpro Corporation, Detroit 20, Michigan.

The coater 100 has the same general shape as the de-greaser 80. The coater 100 has a housing 102 having an aperture in which the inlet chute 101 is located. The inlet chute 101 receives nails from the conveyor 92 and gravity feeds the nails into the coater. The gravity chute 101 is a leg shaped member having a foot-like portion 108. Disposed within the foot of the chute 108, approximately at the juncture point of the foot and leg, is coating mechanism 103 for dispensing a coating solution. A coating solution is sprayed on the nails as they enter the chute foot 108, and the nails are bathed in the coating solution as the solution travels down the foot 108.

Secured to the top of the housing 102 is vibrating mechanism generally 106. Secured to the bottom portion of the vibrating mechanism is a support column 105, which extends downwardy to a point near the bottom of the coater 100. Attached to the support 105 is a spiral trough-like conveyor which extends from the bottom of the column 105 to a point approaching the bottom of the vibrating mechanism 106. The spiral conveyor 104 is adapted to receive nails discharged from the chute foot 108. Perforations are placed at the very toe of the chute foot 108 or in the first ring of the spiral conveyor 104, to allow the coating solution to escape to the bottom of the coater housing 104, where it is filtered (not shown) and returned to a coater storage tank. Also, a small gap may be left between the toe of the chute foot 108 and the first ring of the spiral conveyor 104 to allow the coating solution to find its way to the bottom of the coater housing 102.

The nails are conveyed up the spiral conveyor 104 and are discharged from the top ring of the conveyor 104 into a vibrator conveyor 107 which conveys the nails to the scales of the weigher. The nails as they are conveyed up the spiral conveyor 104 are dried by a forced air system (not shown) so that by the time they reach the conveyor 107 they are completely dry.

Mounted near the top of the coater housing 102 is a limit switch LS12 having an actuator 109 which extends into the chute foot 108. The actuator 109 is actuated by the nails flowing through the chute when the flow is too great and jamming and clogging occurs. Actuation of limit switch LS12 cuts all the mechanism off which feeds the coater as will be described more fully hereinafter.

Weighing Mechanism

Figure 6:
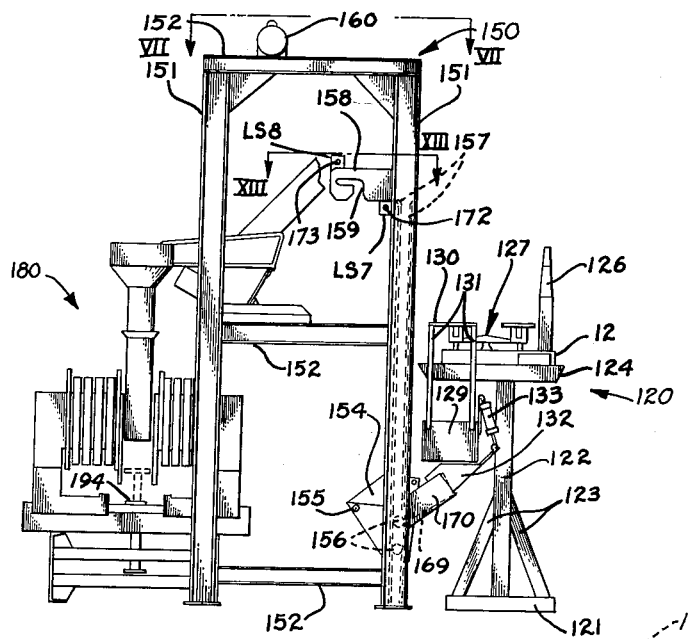
FIG. 6 is a side elevational view of the weigher and skip hoist with the skip bucket in nail receiving position.
Figure 7:
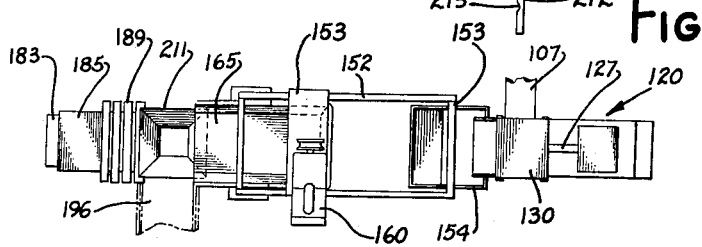
FIG. 7 is a plan view of the apparatus of FIG. 6 looking in the direction of FIG. 7.
Figures 8, 11:
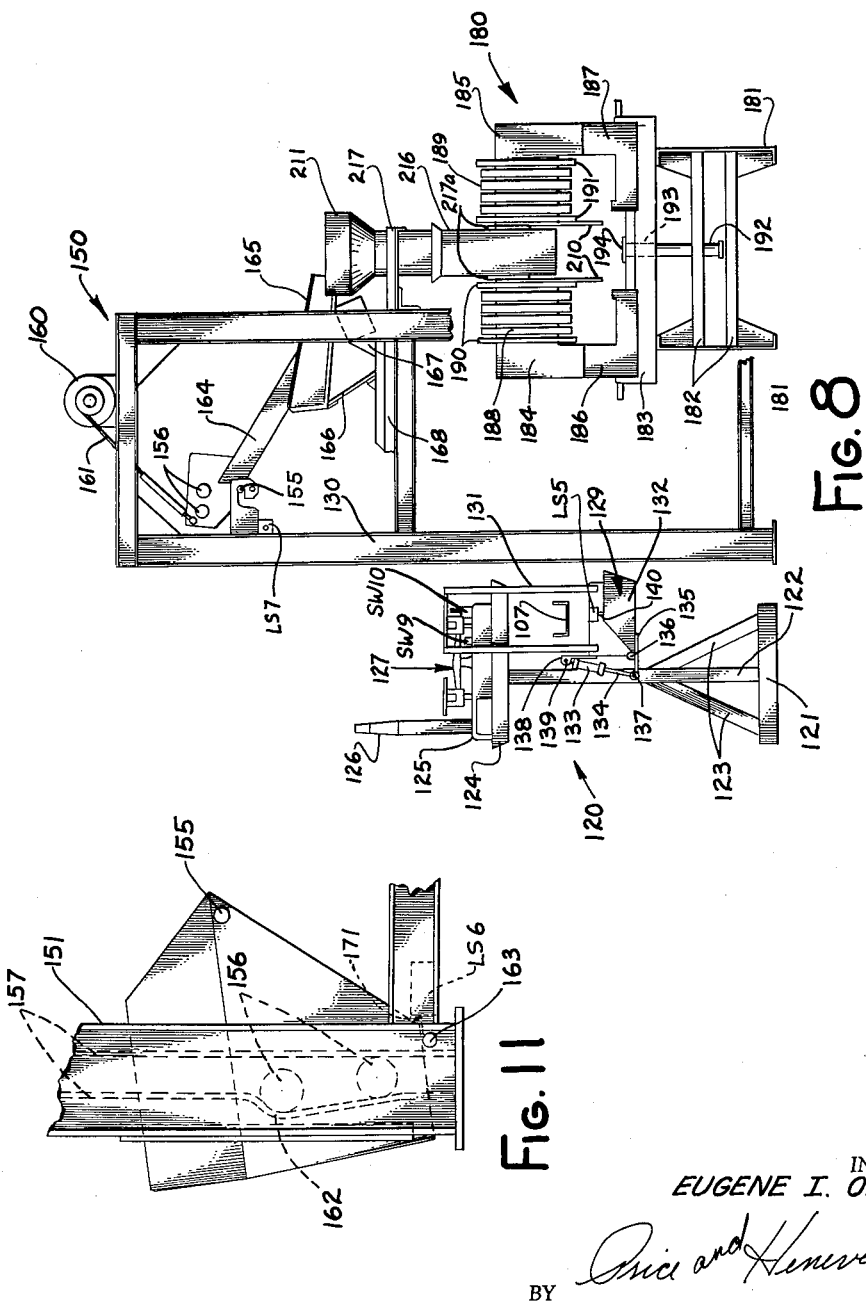
FIG. 8 is a side elevational view of the box receiving side of the nail packager showing the skip bucket in lifted position dumping nails into the packager.
FIG. 11 is a fragmentary view of a portion of the skip hoist.

The weighing mechanism is best illustrated in FIGS. 6, 7 and 8 and is designated generally as 120.

The weighing mechanism is mounted on a stand having a base 121, a vertical support member 122, support braces 123 secured to the base 121 and the vertical support member 122 and a horizontally disposed platform 124 secured to the top of a vertical support member 122.

Mounted on the platform 124 is a scales base 125. Extending upwardly from the scales base 125 is a vertical scales indicator 126. Also secured to the scales base 125 is scales balance mechanism generally 127.

A weigh bucket 129 is suspended from the scales balance mechanism 127 by a weigh bucket frame composed of four legs 131 which extend vertically upward from each corner of the weigh bucket, and a weighing top 130 which ties the legs 131 together and rests upon one portion of the scales balance mechanism 127. Nails are discharged into the weigh bucket 129 by the chute 107 (FIG. 8) and the weight of the nails is indicated by the indicator 126. The weigh bucket bottom 132 is pivotally mounted to the weigh bucket 129 at pivotal connection 136. A plate 135 is attached to the bucket bottom 132 and forms a part of the pivotal connection 136. The plate 135 extends outwardly from the weigh bucket bottom 132 and at the other end thereof forms a pivotal connection 137 with an actuating rod 134 of an air motor 133. An air motor support bracket 138 is secured to the weigh bucket 129, and air motor 133 is pivotally connected thereto at pivotal connection 139. The bucket bottom 132 is U-shaped and forms a chute for directing nails from the weigh bucket 129. Thus, when the air motor 133 is actuated the bucket bottom 132 acts as a trap and pivots about the point 136 and allows the nails within the weigh bucket 129 to be discharged. The operation of the motor 133 will be described more fully hereinafter.

A limit switch LS5 is positioned on the side of the weigh bucket 129 and has a plunger 140 which is adapted to be actuated by the weigh bucket bottom or trap door 132. The operation of the limit switch LS5 will be explained in detail in the explanation of the overall operation of the device.

A first weight switch SW9 is mounted on the scales base 125 and is adapted to be actuated by the bucket frame top 130. Upon actuation of the first weight switch SW9 the feed of the conveyor 107 is reduced so that nails are fed slowly or dribbled into the weigh bucket 129. The nails continue to dribble into the bucket 129 until the exact quantity of nails, for example fifty pounds, has entered the bucket, at which time the second weight switch SW10 is actuated which shuts down the conveyor 107 and prevents further conveyance of nails into the weigh bucket. The first and second weight switches SW9 and SW10 are components of the electrical circuit which will be described hereinafter. When the desired quantity of nails are in the weigh bucket 129 the air motor 133 is actuated and the weigh bucket trap door 132 opens and discharges the nails into an intermediate chute which is connected with the skip hoist now to be explained.

Skip Hoist

The skip moist designated generally as 150 is best shown in FIGS. 6, 7, 8 and 11.

The skip hoist has a frame which is composed of four vertical support columns 151 tied together by horizontal ties 152, and horizontal cross beams 153 (FIG.7). The horizontal ties 152, and cross beams 153 appear at the top and bottom of the vertical support column 151, and at the approximate geometric center thereof.

Two of the vertical support columns 151 face the weigher 120. The vertical support beams 151 are of I-beam cross section, and have skip bucket guide plates 157 secured within the channel of the I-beams. The guide plates 157 are secured to the I-beams 151 so that they face each other to form a track for the skip bucket 154.

The skip bucket generally 154, has guide rollers 156 secured to either side thereof. The guide rollers 156 are axially aligned and adapted to ride within the track formed by guide plates 157 of the vertical support columns 151.

Referring specifically to FIG. 11, the lower portion of the vertical support columns 151, and the guide plates 157 are shown. The guide plates 157, which face the weigher 120, on the respective vertical support beams 151, are bent or bowed outwardly toward the weigher 120 and then inwardly to form a cam and lock surface at 162. The plates 157 taper gradually back toward the other guide plates 157, and assume their original position at the bottom of the vertical support beams 151. A tilt bar 163 is secured to the vertical support beams 151, which face the weigher 120, and is generally parallel to the horizontal cross beams 153. The tilt bar 163 is positioned vertically on the veritcal support beams 151 so that when the skip bucket 154 is in its bottom position one portion of the skip bucket bottom will engage the tilt bar 163 before it strikes bottom and causes that side of the skip bucket to be stopped before the other side of the skip bucket bottom, and thereby causes the skip bucket 154 to be tilted back. The tilt bar 163 is so positioned with respect to the guide rollers 156 and the cam and lock surface 162 so that when the skip bucket 154 strikes the tilt bar 163 the upper roller 156 is forced by the tilting action of the skip bucket into the cam and lock surfaces 162.

Secured to the vertical support beams 151 which face the weigher are intermediate chute brackets 170. The chute brackets 170 support an intermediate chute 169 best shown in FIG. 6. The intermediate chute 169 is positioned with respect to the weigher 120, so that upon actuation of the air motor 133 and opening of the trap door 132, the nails discharged from the weigh bucket 129 enter the intermediate chute 169. The intermediate chute 169 gravity feeds the nails into the skip bucket 154. The necessity of the tilt bar 163 now becomes apparent, since it is necessary to tilt the skip bucket 154 back so that the back edge thereof is disposed under the lip of the intermediate chute 169 to assure that the nails traveling therethrough are discharged into the skip bucket 154. Also, the purpose of the lock and cam surface 162 now becomes apparent. Upon the skip bucket 154 being moved in a vertical direction, the upper guide rollers 156 will act against the cam and stop surfaces 162 and cause the skip bucket 154 to tilt forwardly and move the rear edge of the skip bucket 154 to a position so that it will miss the lip of the intermediate chute as the skip bucket ravels upwardly.

The guide plates 157 extend from the bottom of the vertical support column 151 upwardly for approximately three-quarters of the height of the beams. Secured to the same vertical support columns 151, at the point where the vertical guide plates 157 end, are a pair of trip plates 158. The trip plates are generally rectangular in shape and extend from the vertical support column toward the other vertical support columns 151 which are opposite the weigher 120. The trip plates 158 have L-shaped cam slots 159 formed in the bottom edge thereof. The cam slots 159 are adapted to engage and guide the skip bucket 154, by means of trip pins 155 which extend from either side of the skip bucket 154. Thus, when the skip bucket 154 travels vertically within the guide plates 157, upon reaching the top thereof the pins 155 will engage and follow the cam slots 159 and, cause the skip bucket 154 to tip and dump. During this operation the rollers 156 ride out of the track formed by the plates 157 and pins 155 guide the skip bucket into the dumping position. The skip bucket in the dump position is best shown in FIG. 8. Notice, that the guide plates 157 are flared outwardly at the top thereof to readily receive the guide rollers 156 as the skip bucket 154 descends from its dump position.

A forward and reverse motor 160 is mounted on one of the horizontal cross ties 153 (FIG. 7), and supplies power for raising and lowering the skip bucket 154. A cable 161 is tied to the skip bucket 154 and the motor 160 for raising and lowering the skip bucket 154.

The skip bucket is counterweighted so that the skip bucket will fall due to gravity when the nails or articles have been dumped and the motor 160 is reversed. This is best shown in FIG. 8. Notice that the pins 155 are located on the skip bucket so that the majority of the weight thereof is located toward the bottom of the bucket or toward the tracks 157. Thus, when the motor 160 is reversed slack in the cable 161 will allow the skip bucket 154 to pivot around the pins 155. Cam slots 159 will guide the skip bucket and rollers 156 will re-enter tracks 157.

A limit switch LS6 (FIG. 11) is mounted on the skip hoist frame, and has an actuator 171 which is positioned to be actuated by the skip bucket 154 when it is in its down or nail receiving position. Limit switch LS7 is secured to one of the vertical support columns 151 adjacent the lower surface of the trip plate 158 and has an actuator 172 which is actuated by the skip bucket 154 immediately preceding the engagement of trip pins 155 with cam slots 159. Limit switch LS8 is mounted on one of the trip plates 158 and has an actuator 173 which is actuated by the skip bucket 154 when it is in the dump position. The purpose of these limit switches will be described in detail hereinafter.

A vibrator conveyor, such as a Syntron, having a base 168, vibrating mechanism 167, support and spring mechanism 166 and chute 165 are mounted on the centrally located horizontal cross ties 152. The vibrator conveyor faces away from the weigher 120, and extends beyond the vertical support columns 151 which are opposite the weigher 120. A gravity feed connector chute 164 is secured to the trip plates 158 and projects into the conveyor chute 165. The chute 164 gravity feeds the nails from the skip bucket 154 into the chute 165, which conveys the nails into the hopper of the packaging unit which will now be described.

*Packager*

Figure 9:
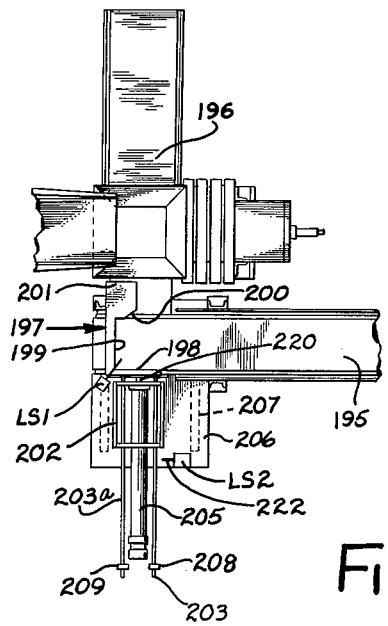
FIG. 9 is a partial plan view of the apparatus of FIG. 8 showing the empty box conveyor, and the mechanism for advancing and positioning the box within the magnetic nail packager.

The packager as best shown in FIGS. 6, 8 and 9 is designated generally as 180.

The magnetic nail packager 180 is supported on a stand composed of vertical support legs 181 and horizontal cross ties 182.

A magnetic pole support beam 183 is secured to each of the vertical support legs 182 and extends therebeyond in either direction. An L-shaped magnetic pole 185 rests on one end of the magnetic pole support beam 183 and is attached thereto by L-shaped brackets 187. A similar shaped second magnetic pole 184 rests on the other end of the magnetic pole support beam 183 and is secured thereto by L-shaped brackets 186. The magnetic poles 184 and 185 are aligned and positioned on the magnetic pole support beam 183 so as to leave an air gap between the pole faces. Coil brackets 191 support coil 189 which surround magnetic pole 185. Similarly coil support brackets 190 support coil 188 which surrounds magnetic pole 184. The circuit for energizing and deenergizing the coils 188 and 189 to form a magnetic flux path is described in my co-pending application Serial No. 814,901, filed May 21, 1959, and entitled Demagnetization System for Magnetizable Article Packager.

A conventional type power belt conveyor 195 (FIG. 9) is positioned adjacent the magnetic nail packager 180 and extends longitudinally therefrom in the same general direction as the magnetic support beam 183. Abutting the conveyor 195, and extending transversely therefrom is a conveyor 196. The conveyor 196 extends from the conveyor 195 through the magnetic nail packager 180, traveling between the bracket legs 186 and 187 of first and second pole brackets and beneath the magnetic poles 184 and 185 continuing on the other side thereof. The conveyor 196 is supported in part by the magnetic support beam 183. Thus, nail carton or boxes can be stored on the conveyor 195 and advanced into the magnetic nail packager 180 by the transverse conveyor 196.

Mechanism for advancing the carton on the transverse conveyor 196 is best shown in FIG. 9. A platform 206 is supported on the conveyor 195 by braces 207, and assumes a position immediately opposite the transverse conveyor 196. Fixed to the platform 207 is an advancer guide bracket 202. The bracket 202 supports an air motor 205 having an actuating rod 220. Secured to the actuating rod 220 is a leg of a generally L-shaped advancing and positioning member 197. Advancer and positioner 197 has a surface 199 on one leg thereof which is dimensioned to correspond substantially with the dimension of one side of the carton, and another leg having a surface 198 which corresponds substantially with the dimension of the other side of the carton. A cam surface 200 leads into the surface 199 so that boxes advancing on the conveyor 195 are directed into and against the surface 199. Advancer and positioner guide rods 203 and 203a are fixed to the leg 198, and slide in apertures which are formed in the advancer and positioner guide bracket 202. The guide rods 203 and 203a offer additional support and accuracy to the advancer and positioner 197. The opposite ends of the guide rods 203 and 203a are threaded and threadedly engaged stop nuts 208 and 209 respectively. The stop nuts 208 and 209 abut against the one end of the advancer and positioner bracket 202, and determines the extent to which the advancer and positioner may extend. This distance is regulated so that a carton positioned against the surfaces 198 and 199 of member 197, will be correctly positioned transversely within the magnetic nail packager when the advancer and positioner is extended.

The guide rod 203 is secured to the one leg of the L-shaped member at the very edge thereof. Thus, the guide rod 203 and the end of leg 197 bearing surface 198 is a continuous surface. When guide rod 203 is fixed to member 197 in this manner the rod 203 prevents the conveyor 195 from bringing a new box into position when the advancer and positioner is in the extended position. When the advancer and positioner is retracting the guide rod slides along the empty carton and when fully retracted the carton is conveyed into position. The leg of the member 197 bearing the surface 198 may be beveled slightly at the point of juncture with the rod 203 to assist the carton into position.

Vertical guide plates 210 are fixed to each face of magnetic poles 184 and 185. Vertical guide plates 210 are within the air gap formed between the two pole faces, and are aligned opposite each other and spaced a distance to just admit the side dimension of the carton which abuts the face 198 of the advancer and positioner 197. Thus, as the carton is advanced by the advancer and positioner 197, the carton is guided between the vertical guide plates 210, and in effect between the faces of magnetic poles 184 and 185.

An insert chute 216 is positioned between the guide plates 210 and secured in proper position therebetween by clamp 217a which are positioned between the chute 216 and the plates 210. The chute 216 and bracket 217 which is secured to vertical support columns 151 of skip hoist 150 supports a hopper 211 which receives nails from the chute 165. The chute 216 is dimensioned so that the lower portion thereof will slide within the inner periphery of the carton walls. A sufficient distance remains between the sides of the chute 216 and the vertical guide plates 210, to allow the walls of the carton to pass therebetween. The chute 216 is also positioned centrally between the pole faces of magnetic poles 185 and 184 in the transverse direction as seen by FIGS. 7 and 9. Clamps 217a may be released to allow a different sized chute for a different sized carton.

An aperture 193 is disposed centrally in the magnetic pole beam support 183 and the conveyor 196, and is disposed centrally of the transverse dimension of the poles 184 and 185, whereas to appear within the confines of the cross sectional dimension of the chute 216. An air motor 192 supported by the horizontal cross ties extends through the aperture 193, and has an actuator rod 219 which is secured to a vertical lift platform 194. The platform 194 is positioned directly beneath the chute 216. The distance between the platform 194 and the bottom of the chute 216 is sufficient to allow the height dimension of the carton to pass therebetween.

Figure 14:
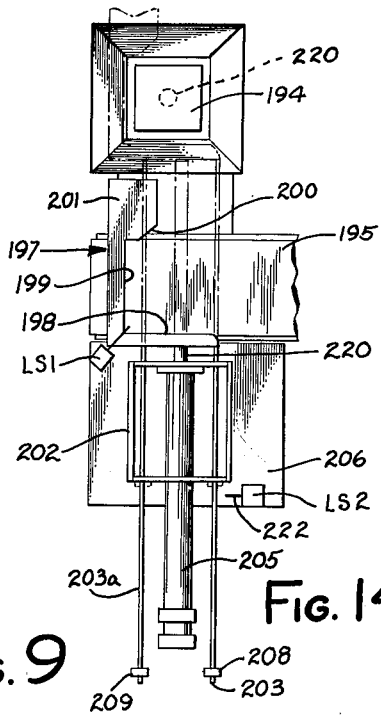
FIG. 14 is a fragmentary view of FIG. 9 showing in phantom the advancer and positioner in an extended position.

FIG. 14 shows the advancer and positioner 197 in phantom in its extended position. FIG. 6 shows the platform 194 in phantom in its up position. Notice in both of the figures that the L-shape of the advancer and positioner 197 allows the leg bearing the surface 199 to pass by the actuator rod 219 of air motor 192 when the lift platform 194 is in the up or nail receiving position. The advancer and positioner 197 must pass by the actuator rod 219 during the retract operation of air motor 205 to be explained more fully hereinafter. The movement of the advancer and positioner is a simple straight line reciprocating motion in a given plane.

A box properly positioned within the positioner and advancer 197 is inserted into the packager 180 upon the actuation of air motor 205. As previously described the stops 208 and 209 determine the distance the positioner 197 extends into the nail packager. This adjustment is set so that the box or carton assumes a position transversely with respect to the magnetic poles 184 and 185, so that when the air motor 192 is actuated the platform 194 will engage the bottom of the carton and cause the carton to slide onto and surround the chute 216 in a manner so that the walls of the carton are not damaged. The carton is positioned longitudinally with respect to the chute 216 by the vertical guide plates 210 as previously described.

When the air motor 192 has been actuated, and the carton raised so that the chute 216 is fully within the carton, nails discharged from the weigh bucket 129, carried by the skip bucket 154 and conveyed by the vibrator conveyor 165 to the hopper 211 are conveyed by the chute 216 into the area of the chute surrounded by the carton. Upon actuation of the coils 188 and 189 a flux path created between the magnetic poles 185 and 184 bridges the gap between the pole faces. In bridging the gap the flux must pass through the carton, chute 216, and the nails within the chute. The nails will align themselves with the flux path, according to well known magnetic principles, and when the coils 188 and 189 are de-energized the nails will settle within chute 216 in their aligned position. Thus, when the air motor 192 is again actuated the carton will be lowered by the platform 194 and the nails will slide from the chute 216 into the carton in an aligned manner as they assumed within the chute 216.

Upon de-energization of the coils 188 and 189, considerable residue magnetism may remain in the poles 184 and 185, thus preventing the nails from falling freely from the chute 216 as the carton is lowered by the platform 194. To counteract residue magnetism a demagnetism is applied to the coils 188 and 189 which is described in my co-pending application Serial No. 814,901, filed May 21, 1959 and entitled Demagnetization System for Magnetizable Article Packager.

Upon the filled carton being lowered by the platform 94 the air motor 205 is again actuated to bring an empty carton from conveyor 195 into proper position. The advancer and positioner 197 has a pusher head 201 which engages the filled carton as the advancer and positioner 197 is extended pushing the filled carton along the conveyor 196, and placing the empty carton in a position to be lifted to the position surrounding the chute 216.

Figure 10:
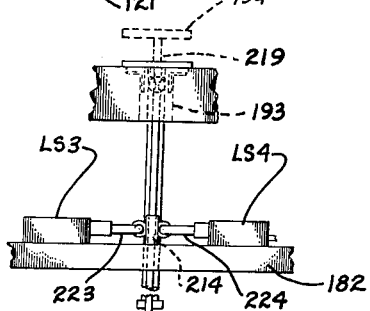
FIG. 10 is a fragmentary view of the magnetic nail packager showing limit switches and limit switch actuating mechanism.

Limit switch LS1 (FIG. 9) is mounted on platform 207 and has an actuator 221 which is actuated by empty cartons traveling on the conveyor 195, just as they approach the surface 199 of advancer and positioner 197. Limit switch LS2 is also mounted on the platform 207 and has an actuator 222 which is actuated by the stop nut 208 as the guide rods 203 are extended and retracted by the air motor 205. Limit switches LS3 and LS4 (FIG. 10) are mounted on the upper horizontal cross tie 182, and have actuators 223 and 224 which face each other. A limit switch actuator rod 212 is secured to the lift platform 194 and is raised and lowered as the platform 194 is raised and lowered. The limit switch actuator rod has cam depressions 213 and 214 which actuate the actuators 213 and 214 respectively. The operation of limit switches LS1, LS2, LS3 and LS4 will be explained in detail in explaining the operation of the automatic nail processor and packager.

*Electrical Circuit*

The electrical circuit for the automatic nail processor and packager is shown in FIGS. 12, 12a, 12b and 12c.

This circuit is connected to a 440 volt, 3 phase, 60 cycle source of power by lines L1, L2 and L3. The switch SW1 is at the fuse box and connects lines L1, L2, and L3, through fuse F1, F2 and F3, to lines 301, 302 and 303 respectively.

The whiskerer drum motor 58 is connected to lines 301, 302, and 303 by each of lines 58a, 58b and 58c respectively. Normally open relay contacts CR58 are placed in the lead lines 58a, 58b and 58c, and must be closed before the drum motor 58 is energized.

Magnetic conveyor motor 12 is connected to lines 301, 302 and 303, by leads 12a, 12b and 12c respectively. Normally open relay contacts CR12M are disposed in the respective lines 12a, 12b and 12c and must be closed before the magnetic conveyor motor 12 can be energized.

Conveyor motor 225 is connected to lines 301, 302 and 303 by leads 225a, 225b and 225c respectively. Normally open relay contacts CR225 appear in the respective lines 225a, 225b and 225c, and prevent the conveyor motor M225 from being energized unless closed.

13

Forward and reverse skip hoist motor 160 has the forward windings thereof connected to lines 301, 302 and 303 by lines F160a, F160b and F160c respectively. The reverse windings of skip hoist 160 are connected to lines 301, 302 and 303 by lead lines R160a, R160b and R160c respectively. Normally open relay contacts CR160F are located in the respective lines F160a, F160b and F160c and must be closed before the forward winding of motor 160 can be energized. Normally open relay contacts CR160R are located in the respective lines R160a, R160b and R160c and must be closed before the reverse winding of the skip hoist motor 160 can be energized.

Motors 58, 12M, 225 and 160 are connected to 440 volts by the lead lines described, and accordingly are 440/220 volts, 3 phase, 60 cycle.

Line 302 leads to one side of the transformer T1, and line 303 is connected to line 304 and leads to the other side of transformer T1 supplying 440 volts to the primary windings thereof. Lines 305 and 305a lead from the secondary windings of transformer T1 and supply 110 volts to lines 307 and 308 across which most of the branch lines are connected. Line 307 passes through fuse F4 and is tapped therebeneath by line 306 which leads to one side of the primary windings of transformer T2. Line 308 is fused by F5 and connected therebelow to line 306a which leads to the other side of the primary windings of transformer T2. Line 309 leads from one side of the secondary windings of transformer T2, and line 309a leads from the other side of the secondary windings of transformer T2, the lines 309 and 309a supplying 10 volts to several branch lines which are connected thereacross.

Referring now specifically to the 10 volt circuit taken from the secondary winding of transformer T2 connected across lines 309 and 309a is branch line 310. Branch line 310 which contains normally open limit switch contacts LS2 is in series with the solenoid 380 disposed in line 310a. Solenoid 380 controls admission of air to the packager air motor 192 (FIG. 8) for raising the platform 194. A bypass circuit composed of line 315 is in series with line 310, and parallel with line 310a. Line 315 contains normally open relay contacts CR14, and solenoid 385 which operates the return of retract portion of box positioner air motor 205 (FIG. 9). Also connected across lines 309 and 309a is branch line 311 containing contacts of normally open time switch PT4. In series with the time switch PT4 is the solenoid 381 which controls the admission of air to air motor 192 (FIG. 8) for lowering the platform 194. Branch line 312 is connected across the lines 309 and 309a and contains normally closed time switch contacts PT1, normally open relay contacts 12CR, and solenoid 382 which controls dumping action of the air motor 133 of the weigher 120 (FIGS. 6 and 8). Branch line 313 is also connected across lines 309 and 309a, and contains normally closed limit switch contacts LS5, normally open relay contacts 13CR and solenoid 383 which controls the non-dumping portion of air motor 133. Finally branch line 314 is connected across lines 309 and 309a, and contains in series limit switch contacts (normally open) LS1, limit switch contacts (normally closed) LS4, normally open relay contacts 2CR, and solenoid 384 which controls the positioner air motor 205 (FIG. 9).

The following branch lines are connected across the lines 307 and 308 which are connected with the secondary of transformer T1 by lines 305 and 305a.

Line 317 contains switch SW2 and relay solenoid 1CR. Normally open relay contacts CR1 of relay coil 1CR are in series with line 307. A secondary feed line 386 is tapped off from line 307 just below relay contacts CR1, and the following lines are connected across feed lines 386 and 308.

Line 318 contains stop switch SW3A, start switch SW3 and solenoid relay coil 2CR. A line 319 bypasses solenoid relay coil 2CR and feeds a transformer T3. A line

14

387 from the secondary of transformer T3 passes through an indicator light 388. Normally open relay contacts CR2 of solenoid relay 2CR are placed in series with line 386 immediately below the connection of line 318 with line 386. Line 320 is connected to line 386 immediately below relay contacts CR2, and is connected to line 318 so as to bypass the start switch SW3 and lock in solenoid relay coil 2CR circuit. Normally closed relay contacts CR11 are disposed in series with line 386 immediately below the connection of line 320 with 386. Connected to line 386 on the other side of relay contacts CR11, and to line 308, is line 321. Line 321 contains an on-off nail conveyor switch SW4, in series with normally closed relay contacts CR17, normally closed relay contacts CR10 and solenoid relay coil 12MCR. Line 322 is connected across lines 386 and 308, and contains de-whiskered drum on-off switch SW5 in series with contacts of jog switch SW6, normally closed relay contacts CR17, normally closed relay contacts CR10, and solenoid relay coil 58CR. Line 323 is connected to feed line 307 and line 322 so as to bypass on-off switch SW5, and contains contacts of jog switch SW6 for completing a circuit around SW5. Line 324 is connected across lines 368 and 308, and contains normally closed limit switch contacts LS11 which are in series with normally closed limit switch contacts LS10, normally closed relay contacts CR17, normally closed relay contacts CR10, and solenoid relay coil 3CR. Line 325 connects to line 308 and taps line 324 between limit switch contacts LS11 and LS10, and contains timer 7PT solenoid relay coil.

The electrical circuit for pre-weigher 315 is shown in FIG. 12b, and is connected at terminals 389 and 390 of feed lines 307 and 308 respectively. Lines 307 and 308 of FIG. 12b are the same lines 307 and 308 shown in FIG. 12. Line 326 is connected across feed lines 307 and 308, and includes normally closed relay contacts CR16 in series with timer motor 396. Line 397 is connected to line 326 and line 307, and is in series with line 326. Line 397 has clutch solenoid 398 which controls the motor of timer 396. Also, tied across lines 307 and 308 is line 328 having components including the normally open relay contacts CR16, normally closed timer switch contacts PT6, and solenoid relay coil 16CR. Another line 330 is connected across lines 307 and 308 and contains timer switch SW396 in series with solenoid timer coil 6PT. Line 329 is connected to line 308, and taps lines 328 and 330 so as to be in series with both. Line 329 bypasses both 16CR and 6PT, and contains solenoid 331 which controls actuator air motor 24. Line 332 tied across the lines 307 and 308 has in series normally open time switch contacts PT7 and transformer T4. Circuit 333 leads from the secondary of transformer T4 through the indicator light 391 and returns to the other side of the transformer T4 secondary.

Referring again to FIG. 12, line 334 is disposed between feed lines 386 and 308, and contained in series normally closed relay contacts CR17 and solenoid coil 18CR. Finally connected across lines 386 and 308 is line 336 which contains normally closed relay contacts CR17 and solenoid relay coil 5CR.

Line 337 is connected to lines 307 and 308 and has limit switch contacts LS5, normally open relay contacts CR9, normally open contacts CR5, contacts of switch SW7, and solenoid relay coil 6CR. Line 338 is tapped to line 336 between relay contacts CR17 and solenoid relay coil 5CR, and contains the other contacts of switch SW7, and taps line 337 between relay contacts CR5 and solenoid relay coil 6CR. Line 339 connects with line 308 and taps line 337 between relay contacts CR9 and CR5. Line 339 connects normally open relay contacts CR18 and solenoid relay coil 19CR. Bridging lines 307 and 308 is line 340 which contains solenoid relay coil 7CR. Line 337 is tapped between normally open limit switch contacts LS5 and relay contacts CR9 by line 341. Connected to line 341 is line 342 which also connects to line 308. Line 342 contains in series normally closed limit switch contacts LS7, normally open relay contacts CR12, normally open relay contacts CR13, normally closed relay contacts CR160R and solenoid relay coils 160FCR. Line 343 taps line 342 between relay contacts CR12 and limit switch contacts LS7 and is connected to line 341. Line 343 contains normally open contact relay contacts CR15 and time switch contacts PT5 in series. Line 344 is connected across lines 307 and 308 and has placed therein normally open relay contacts CR2 in series with normally closed limit switch contacts LS6, contacts of switch SW8, normally open relay contacts CR160R, normally closed relay contacts CR160F, and solenoid relay coils 160RCR. A bypass circuit 346 taps line 344 between limit switch contacts LS6 and contacts of switch SW8 at a terminal 392, and between relay contacts CR160R and relay contacts CR160F. Line 346 contains the other contacts of switch SW8. Line 345 also taps line 344 between terminal 392 and switch contacts SW8 of line 344, and again connects line 344 between relay contacts CR160R and relay contacts CR160F. Line 345 contains timing switch contacts PT3. Line 347 is connected to terminal 392 in line 344 and to line 308. Line 347 contains normally closed relay contacts CR9 in series with solenoid relay coil 11CR. Line 344 is further tapped between relay contacts CR2 and limit switch contacts LS6 by line 348. Line 349 is connected across lines 348 and 308. Normally closed relay contacts CR9, normally open relay contacts CR7, normally open contacts of limit switch LS6, and solenoid relay coil 12CR are arranged in series in line 349. Line 350 is tied across lines 307 and 308, and contains in series normally closed contacts of limit switch LS8 normally open relay contacts CR12, and timer solenoid coil 1PT. A line 351 taps line 349 between limit switch contacts LS6 and solenoid relay coil 12CR and connects with line 350 between relay contacts CR12 and timer solenoid coil 1PT. A line 398 taps line 342 between relay contacts CR13 and relay contacts CR160R, and contains switch SW13 which connects with line 350 between relay contacts CR12 and limit switch contacts LS8. Line 352 taps line 350 between its connection with line 307 and limit switch contacts LS8 and connects with line 308. Line 352 contains normally open contacts of limit switch LS8 in series with timer solenoid coil 3PT.

FIG. 12c shows an electrical circuit which is a component of the electrical circuit in co-pending application Serial No. 814,901, filed May 21, 1959, and entitled Demagnetization System for Magnetizable Article Package, now U.S. Patent No. 2,996,863. Line 327 is connected to contacts 61 and 42 of the above mentioned application. Line 327 contains the switch contacts of timer PT2 in series with the normally open relay contacts CR15.

Figure 12A:
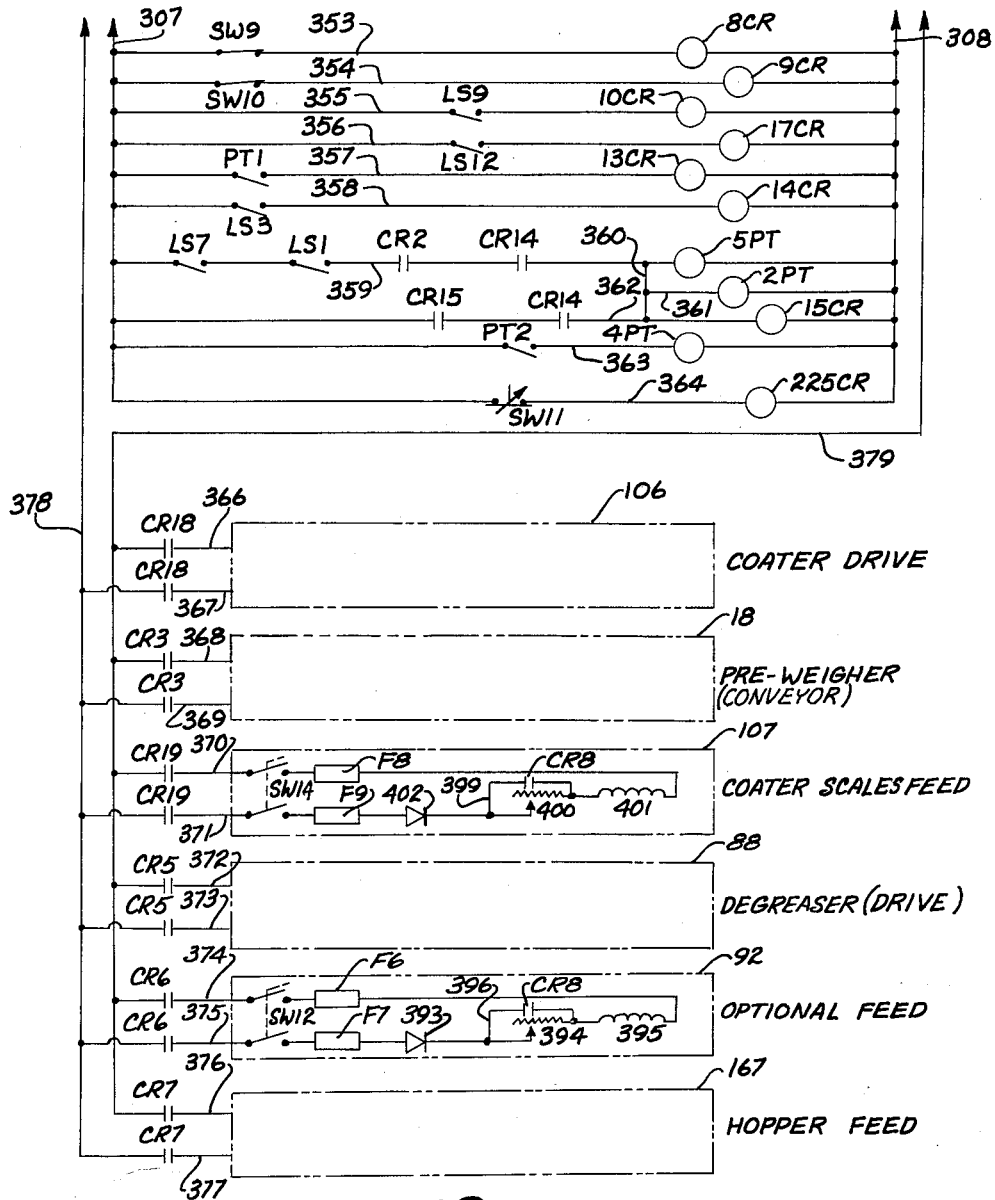

Referring now to FIG. 12a lines 307 and 308 thereof are continuation of lines 307 and 308 of FIG. 12. Connected across lines 307 and 308 is line 353 which contains normally closed contacts of a weigh switch SW9 in series with solenoid relay coil 8CR. Line 354 is connected across line 307 and line 308 and has in series weigh switch contacts SW10 (normally closed) and solenoid relay coil 9CR. Line 355 is connected across lines 307 and 308 and contains normally open limit switch contacts LS9 in series with solenoid relay coil 10CR. Line 356 is connected to lines 307 and 308 and contains in series the normally open contacts of limit switch LS12 and solenoid relay coil 17CR. Also connected to line 307 and line 308 is line 357 with timer switch contacts PT1 in series with solenoid relay coil 13CR. Line 358 is connected across lines 307 and 308 and contains the contacts of limit switch LS3 in series with solenoid relay coil 14CR. Line 359 contains in series normally open contacts of limit switch LS7, normally open contacts of limit switch LS1, normally open relay contacts CR2, normally open relay contacts CR14, and timer solenoid coil 5PT connected across lines 307 and 308. Line 362 is connected across lines 307 and 308 and contains in series normally open relay contacts CR15, normally open relay contacts CR14, and solenoid relay coil 15CR. Line 360 taps line 359 between relay contacts CR14 and timer solenoid 5PT, and connects with line 362 between relay contacts CR14 and solenoid relay coil 15CR of line 362. Line 361 connects to line 360 and to line 308 and contains timer solenoid coil 2PT. Line 363 is connected across lines 307 and 308 and contains timer switch contacts PT2 in series with timer solenoid coil 4PT. Finally line 364 is connected across lines 307 and 308 and contains switch SW11 in series with solenoid relay coil 225CR.

Line 378 (FIG. 12) taps line 302 and continues on to FIG. 12a where it functions as a feeder line. Line 379 connects with line 301 (FIG. 12) and continues on to FIG. 12a where it functions as a return line. Line 367 is tapped to line 378 and leads to one side of the coater drive 106. Line 367 contains normally open relay contacts CR18. Line 366 is a return line from the coater drive and connects to line 379. Line 366 contains normally open relay contacts CR18. Line 369 connects to line 378 and leads to one side of the pre-weigher vibrating mechanism 18. Line 369 contains normally open relay contacts CR3. Line 368 is connected to the other side of the pre-weigher vibrating mechanism 318 and to return line 379. Line 368 also contains relay contacts CR3. Line 371 is connected to line 378 and to one side of coater scales feed 107, and contains normally open relay contacts CR19. Line 371 continues in coater scales feed 107 and contains in series contacts of switch SW14, a fuse F9, selenium rectifier 402, rheostat 400 and connects to vibrating magnet 401. Line 399 taps line 371 between selenium rectifier 402 and again connects line 371 between rheostat 400 and vibrating magnet 401 to bypass rheostat 400. Line 370 connects to the other side of vibrating magnet 401 and contains fuse F8 in series with contacts of switch SW14, normally open relay contacts CR19, and connects with line 379. Line 373 connects with one side of the de-greaser drive 88 and with line 378. Line 378 contains normally open relay contacts CR5. Relay contacts CR5 are also in line 372 which connects with the other side of the de-greaser drive 88 and with line 379. Line 375 connects with line 378 and one side of optional feed conveyor 92. Normally open relay contacts CR6 are disposed in line 375. Line 375 continues within the optional feed conveyor 92 and has contacts of switch SW12, fuse F7, selenium rectifier 393, rheostat 394, and vibrating magnet 395 all in series. Line 396 taps line 375 between selenium rectifier 393 and rheostat 394 and connects line 375 again between rheostat 394 and vibrating magnet 395. Line 396 contains normally open relay contacts CR8. Line 396 forms a bypass circuit around rheostat 394. Line 374 connects with line 379 and leads to the other side of optional feed conveyor 92. Line 374 continues within optional feed conveyor 92 and has contacts of switch SW12, and fuse F6 in series and is connected to vibrating magnet 395. Finally line 377 is connected to one side of hopper feed vibrator 167 and to line 378. Line 377 contains normally open relay contacts CR7 the other side of hopper feed motor 167 is connected to line 379 by line 376. Line 376 contains normally open relay contacts CR7.

Coater drive, pre-weigher conveyor, de-greaser drive, and hopper feed vibrator are illustrated by block diagram and all contain essentially the same element as contained within the optional feed motor circuit 92, excepting the bypass circuit around the rheostat, therefore, these elements will not be explained in detail. Having described the electrical circuit of the automatic processor and packager the operation thereof will now be explained.

Operation

Switch SW1 (FIG. 12) is closed supplying 440 volt, 3 phase, 60 cycle power to lines 301, 302, and 303. Switch SW1 is at a box (not shown) containing main line fuses F1, F2, and F3, and is manually operated and normally assumes the closed position.

Air motors 24, 60, 133, 192 and 205 are supplied from a common source (not shown) which is any well known type of compressor and distribution system.

To initiate operation of the automatic nail processor and packager the switch SW2 (FIG. 12, line 317) is closed which energizes solenoid relay coil 1CR and closes normally open relay contacts CR1 in line 307. With relay contacts CR1 closed power from the secondary of transformer T1 is supplied to line 386.

Start switch SW3 in line 318 is actuated completing a circuit through line 318 which energizes solenoid relay coil 2CR and closes its normally open relay contacts CR2 in line 386. Upon relay contacts CR2 closing a circuit is completed to line 320 which bypasses switch SW3 and locks in solenoid relay coil 2CR. Also, normally open relay contacts CR2 of line 314 have been closed as have the normally open relay contacts CR2 of line 344.

With relay contacts CR11 normally closed power is supplied to the remainder of line 386. Thus, the on-off switch SW4 when closed completes a circuit through line 321 since relay contacts CR17 and CR10 are normally closed. This energizes solenoid relay coil 12MCR closing its normally open relay contacts CR12M. With relay contacts CR12M closed the magnetic conveyor motor 12 of magnetic conveyor 11 (FIGS. 1 and 2) is energized.

Closing switch SW5, and assuming jog switch SW6 is closed, a circuit is completed through line 322, since relay contacts CR17 and CR10 are closed. Solenoid relay coil 58CR is energized closing its contacts CR58, which energizes de-whiskerer drum motor 58 (FIGS. 3 and 4), and rotation of the de-whiskerer drum 50 begins.

The contacts of limit switch LS11 and LS10 on the pre weigher (FIG. 2) are closed while the nails are being introduced into the pre-weigher. This closes a circuit through the line 324 since relay contacts 17CR and 10CR are normally closed. This circuit energizes solenoid relay coil 3CR and thus closes the normally open contacts CR3 (FIG. 12a) of the pre-weigher conveyor 18 and activates this conveyor.

Power flows through line 334 since relay contacts CR17 are normally closed, and solenoid relay coil 18CR is energized closing its contacts CR18 (FIG. 12a) which actuates coater drive 106 (FIGS. 5 and 12a). Relay contacts CR18 (line 339) are also closed energizing solenoid relay coil 19CR and closing its contacts CR19 (FIG. 12a) actuating the coater scales feed 107 provided limit switch contacts LS5 and relay contacts CR9 are closed in a manner soon to be described.

Power is also suplied to line 336 (FIG. 12) and flows therethrough since relay contacts CR17 are normally closed. This energizes solenoid relay coil 5CR and causes its contacts CR5 (FIGS. 5 and 12a) to close and energize the de-greaser drive 88. When manually operated switch SW11 (FIG. 12a) is closed a circuit is completed through line 364, and solenoid relay 225CR is energized closing its contacts CR225M (FIG. 12) and energizing conveyor motor 225 (FIG. 12) of conveyor 195 (FIG. 7). The above described operation thus far describes the operation of the drum motor 58, magnetic conveyor motor 12, carton conveyor motor 225, the degreaser drive 88, and the coater drive 106. These components in their operation feed clean nails to the weigher 120.

Referring now specifically to FIGS. 2 and 12b, the operation of the pre-weigher will now be described. Nails are being fed by the conveyor 11 and discharged into the chute 16. The chute 16 conveys the nails to the pre-weigher bucket 20, and continues to feed the nails until the weight of nails and the bucket overcomes the spring 32, and the platform 29 moves downwardly. On the downward movement of platform 29 limit switch LS10 is opened, line 324 (FIG. 12), and solenoid relay coil 3CR is de-energized opening relay contacts CR3 (FIG. 12a) shutting down pre-weigher conveyor 18. A circuit is completed through line 326 (FIG. 12b) if switch SW2 is turned since line 326 is connected directly across lines 307 and 308, and since relay contacts CR16 are normally closed. This energizes clutch solenoid 398 and starts timer motor 396 which when it times out mechanically closes switch SW396 in line 330. This completes a circuit through part of line 328 and through lines 329, 330 and 331. This energizes dump solenoid 331 of air motor 24. Thereupon, trap door 21 of pre-weigher 20 is pivoted about pivotal connection 22 and allows the nails to pass from the bucket 20 into the gravity chute 37. When timer switch contacts SW396 are closed timer solenoid 6PT and solenoid relay coil 16CR are both also energized. Relay contacts 16CR (line 328) are energized and complete a circuit through line 328 and lock in solenoid relay coil 16CR. Timer switch contacts PT6 remain closed until timer solenoid coil 6PT has timed out. At the same time relay contacts CR16 of line 326 open and de-energize clutch solenoid 398 of timer motor 396 (line 397). When clutch solenoid 398 is disengaged the drive to the timer motor ceases and timer motor 396 is reset by a spring (not shown). Upon the timer 396 resetting itself switch SW396 in line 330 is mechanically opened. When timer 6PT times out, which opens contacts PT6, solenoid relay coil 16CR timer solenoid coil 6PT and dump solenoid 331 are de-energized. Upon solenoid relay coil 16CR becoming de-energized, relay contacts CR16 of line 328 open, and relay contacts CR16 of line 326 close. Thus the circuit is again completed to timer motor 396 and clutch solenoid 398 to restart the timer. When dump solenoid 331 is de-energized air motor 24 of pre-weigher 15 is energized so as to close trap door 21. As trap door 21 closes limit switch LS11 is closed, and limit switch LS10 has previously closed upon the nails leaving the pre-weigher bucket 20, since the spring 32 returns the platform to its switch disengaging position. Thus, the circuit is again completed to solenoid coil 3CR and pre-weigher conveyor 18 again feeds nails to chute 16.

Timer 396 can be regulated, and is set to trip every few seconds regardless of whether sufficient nails have entered the pre-weigher bucket 20 to trip limit switch LS10. However, timer solenoid coil 7PT is set so that if limit switch LS11 does not open for a given length of time, for example twenty seconds, then timer switch contacts PT7 (line 332) are closed completing a circuit to transformer T4. Line 333 from the secondary of transformer T4 energizes indicator light 391 on the control panel, which is an indication to the operator that nails are coming too slow. The rate of nail flow to the pre-weigher is then increased until a proper balance with the timer is obtained. Timer 396 is set to provide an even flow and regulated quantity of nails to the de-whiskerer 40.

After the nails are pre-weighed they are automatically processed through the de-whiskerer, de-greaser, coater, weigher, in that sequence, before they are packaged. However, all these components are controlled by the packager which therefore will now be described before the other components.

As previously explained the conveyor motor 225 has been energized and provides power to the conveyor 195, which carries empty cartons thereon. FIG. 9, shows limit switch LS1 mounted so that its actuator 221 is actuated by a carton conveyed against the surfaces 198 and 199 of box positioner and advancer 197. Thereupon the contacts of limit switch LS1 are closed and a circuit is completed through line 314 (FIG. 12) since relay contacts CR2 have been previously closed, and limit switch contacts LS4 are normally closed. This energizes the solenoid 384 of air motor 205 and causes box positioner and advancer 197 to extend carrying along therewith the empty carton. As advancer and positioner 197 extends, nut 208 carried therewith by one of the guide rods 203, trips actuator 222 of limit switch LS2 closing the contacts thereof and completing a circuit through line 310 (FIG. 12). This energizes solenoid 380 of lift air motor 192 and causes the actuator rod 219 of air motor 192 to lift platform 194 and carry the carton to its position surrounding the chute 216.

As platform 194 raises the carton, limit switch actuator rod 212 (FIG. 10) is carried therealong since it is attached thereto. Limit switch LS3 is actuated by its actuator or plunger 223 entering the depression 213 of actuating rod 212. Thus, limit switch contacts LS3 of line 358 are closed and a circuit is completed therethrough energizing the solenoid relay coil 14CR. Energization of 14CR closes relay contacts CR14 of line 316 which actuates solenoid 385 of air motor 205 causing the advancer and positioner 197 to be retracted. However, as platform 194 is raising, plunger 224 of limit switch LS4 is moved from depression 214 of actuator rod 212 which opens the limit switch contacts LS4 (line 314) and de-energizes solenoid 384 allowing solenoid 385 to take over. This also prevents another box from being moved into position by the advancer and positioner 197. Thus, the advancer and positioner 197 cannot be again actuated until lift platform 197 has returned to down position. The box is now in position to receive nails.

As previously explained by actuating switch SW2 and start switch SW3, motors and conveyors have been actuated so that nails are being fed through the pre-weigher, de-whiskerer, degreaser and coater. Nails are fed through the various components and eventually from scales (coater) 107 into the weigher bucket 129. Limit switch contacts LS5 (line 337) are normally closed when the weigher bucket bottom 132 is closed to receive nails. Weight switch SW10 (line 354) is closed until the weight of the nails and bucket 129 is sufficient to open it. Therefore, solenoid relay coil 9CR (line 354) is energized and its relay contacts 9CR (line 337) are closed. Since relay contacts CR18 (line 339) are closed, solenoid relay coil 19CR is energized closing its relay contacts CR19 (lines 370 and 371) energizing coater scales feed 107. Weight switch SW9 (line 353) is also closed until the weight of nails is sufficient to open it. This completes a circuit through line 353 energizing solenoid relay coil 8CR which closes its contacts CR8 in coater scale feed 107 and bypasses rheostat 400 causing the scale feed to run at normal fast speed. Nails continue to feed at a normal fast rate until a predetermined weight of nails, for example forty-eight pounds, has entered the weigh bucket 129.

As previously explained, the weigh bucket 129 is supported on the scales balanced mechanism 127 by a frame composed of members 130 and 131. Upon the weight of nails reaching the predetermined weight in the weigh bucket 129 the balance mechanism 127 moves over center and trips weight switch SW9. The balance mechanism 127 is also controlled by a rate spring (not shown) which prevents the balance mechanism 127 from going over center rapidly for purposes which will presently be explained.

When weight switch SW9 is opened solenoid relay coil 8CR is de-energized opening its relay contacts CR8, thus opening line 399 and causing the current to flow through rheostat 400. Rheostat 400 regulates the current to the vibrating magnet 401 and is adjusted so that the speed of coater scales feed 107 is greatly reduced. This in turn greatly reduces the rate at which nails are conveyed by coater scales feed 107 into the weigh bucket 129. Therefore, with weight switch SW9 open the nails are fed slowly or dribbled into the weigh bucket 129. When a final predetermined weight, for example fifty pounds, has entered the weigh bucket 129, the second normally closed weight switch SW10 (line 354) is tripped. Since weight switch SW10 is normally closed, a circuit has previously been completed through line 354 (FIG. 12a) and solenoid relay coil CR9 has been energized maintaining its normally closed relay contacts CR9 (lines 347 and 349) open. However, upon the opening of weight switch SW10 solenoid relay coil 9CR is de-energized closing relay contacts CR9 which in turn energizes solenoid relay coil 11CR (line 347) and opens its relay contacts CR11 momentarily (line 386). However, as soon as weigher bucket 129 has dumped the balance mechanism 127 goes back over center closing switches SW9 and SW10 and the nails again start to feed. Energization of 11CR cuts down the feed of nails from motor scales drive 107 back to the magnetic nail conveyor 11, so that no more nails will be fed into the weigh bucket 129, and nail jamming will not occur in the de-greaser and coater. Contacts CR11 (line 386) open and shut down the feed of nails when the weigh bucket 129 is full and the skip bucket is not in the down position ready to receive another load of nails.

The rate spring previously mentioned prevents the balance mechanism from going over center rapidly and tripping both weight switches SW9 and SW10 at the same time. Thus, the balance mechanism 127 moves very slowly as the last couple of pounds of nails are being fed into the weigh bucket 129.

The weigh bucket 129 is arranged to dump into the skip bucket 154, however, this dumping cannot occur unless the bucket 154 is in the lower position of FIG. 11. When in the lower position of FIG. 11 the contacts of limit switch LS6 (located in line 349 of FIG. 12) will be closed and a circuit through a portion of line 344 and lines 348 and 349 will be completed. This energizes solenoid relay coil 12CR and closes its relay contacts CR12 (line 312) energizing solenoid 382 which controls the dump portion of air motor 133 (FIG. 6).

The apparatus and control circuit is arranged to automatically close the bucket bottom 132 after the nails are dumped from the bucket. The timing of this is controlled by a timer 1PT which is energized at the same time as solenoid coil 12CR, and when it times out it actuates its solenoid coil which opens switch contacts PT1 (line 312) and de-energizes solenoid 382. Also upon timer 1PT timing out its solenoid coil closes switch contacts PT1 (line 357) and energizes solenoid relay coil 13CR and closes its relay contacts CR13 (line 313). Limit switch LS5 on the weigh bucket 129 is closed by the opening of weigh bucket bottom 132 causing a circuit to be completed through line 313. This energizes solenoid 383 (line 313) which controls the close portion of air motor 133 and causes the weigh bucket bottom 132 to close.

Closing of the weigh bucket 132 again opens limit switch contacts LS5 in line 313 and again closes limit switch contacts LS5 in line 337. This completes the circuit through lines 337, 341 and 342 which is required to initiate the operation of the skip hoist.

The contacts of limit switch LS7 in line 342 are normally closed, and relay contacts CR12 and CR13 have been previously closed. Relay contacts CR160R are normally closed. Thus, solenoid relay coil 160FCR is energized closing its relay contacts CR160F which energizes the forward winding of skip hoist motor 160 (FIG. 6). Skip bucket 154 is raised by motor 160 and cable 161 until actuator 172 of limit switch LS7 (FIG. 8) is tripped by the skip bucket opening limit switch contacts LS7 in line 342 and closing contacts LS7 in line 359 (FIG. 12a).

The skip bucket 154 is not raised past limit switch LS7, and therefore will not dump its nails, until a box is in position on the lower end of a chute 216 (FIG. 8), in which position limit switch LS3 (FIG. 10) is closed, and a box is in position within the advancer 197 which closes limit switch LS1. When a box is in position on the insert chute 216 closing contacts of limit switch LS3 (line 335), solenoid relay coil 14CR is energized closing contacts CR14. Thus a circuit is completed through line 359 since contacts CR2, CR14 and limit switches LS1 and LS7 are closed. This also completes a circuit through lines 361 and 362 via line 360. This energizes timers 5PT and 2PT. Solenoid relay coil 15CR is also energized which closes relay contacts CR15 (line 343). With relay contacts CR15 closed and timer switch contacts PT5 closed, limit switch LS7 in line 342 is bypassed energizing coil 160FCR through the previously closed relay contacts CR12 and CR13. This locks in the forward windings of motor 160 and the skip bucket 154 will continue to travel upwardly. Notice, that limit switch LS7 is positioned so that the contacts thereof are opened prior to the skip trip pins 155 entering the trip plate 158. The skip bucket 154 continues to move upwardly and the skip trip pins enter the cam plates 159 and the nails are dumped into the gravity chute 164 and conveyed into the hopper conveyor feed 165.

As the skip bucket dumps its load it trips limit switch LS8 (FIG. 6), and opens limit switch contacts LS8 (line 350) and closes limit switch contacts LS8 (line 352) completing a circuit through part of line 350 and through line 352 energizing timer 3PT. Timer 3PT times out and energizes its solenoid relay coil to close switch contacts PT3 of line 345. This completes a circuit through lines 344 and 345 energizing solenoid relay coil 160RCR and closing its relay contacts CR160R. This energizes the reverse windings of skip hoist motor 160 and lowers the skip bucket 154. Previously when limit switch contacts LS8 (line 350) opened solenoid timer relay 1PT is de-energized opening its relay contacts PT1 (line 357) and de-energizing solenoid relay coil 13CR. Upon de-energizing solenoid relay coil 13CR its contacts CR13 (line 342) are opened de-energizing solenoid relay coil 160FCR and the forward windings of motor 160.

Timer 5PT serves an important function. Should the skip hoist 154 go down and pick up another load of nails from weigh bucket 129 and return to the dump position before the nails have been packaged in packager 180, timer 5PT will have timed out in the interval and de-energize the forward windings of skip hoist motor 160 by opening its contacts PT5 (line 343) preventing the nails from dumping. Thereafter, the advancer and positioner 197 and lift platform 194 must go through the proper cycle to place a new carton in position on insert chute 216 before the skip bucket dumps its load. Notice, that when the advancer and positioner 197, and lift platform 194 go through their cycle limit switch contacts LS3 (line 358) are closed energizing solenoid relay coil 14CR and closing its relay contacts CR14 (line 359). Limit switch contacts LS1 (line 359) will be closed since a new carton is in position within the advancer and positioner 197. Relay contacts CR2 are closed and limit switch contacts LS7 (line 359) are closed since the skip bucket 154 is in the up position. Solenoid relay coil 15CR (line 362) is energized via lines 359, 360 and 362 which closes its relay contacts CR15 (line 343). Timer 5PT was reset by the lift platform cycle and its contacts 5PT (line 343) closed thereby. Thus, a circuit is completed to forward windings of motor 160. The skip bucket 154 is then pulled into dump position and dumps its load. Thus timer 5PT also acts as a safety device preventing nails from going to the packager 180 unless the packager is ready to receive them.

Before the nails are dumped and in timed sequence with the operation of the skip hoist, the magnet coils 188 and 189 are energized. This step occurs simultaneously with the energization of solenoid relay coil 15CR, as previouly described. Coil 15CR closes its contacts CR15 in line 327 in FIG. 12c which completes a circuit through line 327 of the magnet circuit, since timer switch contacts PT2 are normally closed. Thus, the magnet is energized and aligns the nails within the insert chute 216. When timer switch 2PT times out its solenoid relay coil is energized and timer switch contacts PT2 are opened (FIG. 12c), and the circuit through line 327 is broken and the coils 188 and 189 are de-energized allowing the nails to fall. At the same time timer switch contacts PT2 of line 363 are timed closed and a circuit is thereby completed through line 363 energizing timer 4PT. When timer 4PT times out its solenoid relay coil actuates its relay contacts PT4 (line 311) and completes a circuit through line 311. This energizes solenoid 381 which controls the down portion of air motor 192 and the lift platform 194 lowers the packaged nails.

As lift platform 194 lowers the packaged nails switch actuator 212 is also lowered and opens limit switch contacts LS3 (line 358) de-energizing solenoid relay coil 14CR, which in turn drops out timer 5PT, timer 2PT, and solenoid relay coil 15CR setting up the circuit for another cycle. When actuator rod 212 is in its down position, limit switch contacts LS4 close (line 314) and a circuit is again completed through line 314 to actuate solenoid 384 which controls air motor 205 and extends the advancer and positioner 197. As the positioner and advancer 197 extends the advancer head 201 engages the filled carton of nails resting on the lift platform 197 and pushes them onto the conveyor 196 as the new carton is positioned under the insert chute 216. Thus, a cycle has been completed and a new cycle as previously described repeats itself.

Limit switch LS9 is positioned within the de-greaser (FIG. 5) and its actuator 93 is arranged in the conveyor 83 so that it will be actuated by nails flowing therethrough if the rate of flow becomes excessive. Upon closing of limit switch LS9 its contacts (line 355) are closed and solenoid relay coil 10CR is energized. Upon energization of solenoid relay coil 10CR its contacts CR10 (lines 321, 322 and 323) are opened de-energizing solenoid relay coils 12MCR, 58CR and 3CR, which effectively stops the feed of nails to the de-greaser 80.

Coater 100 has a limit switch LS12 positioned therein so that its actuator 109 is actuated when the flow of nails in the coater becomes excessive. Upon actuation of actuator 109 the contacts of limit switch LS12 (FIG. 12a) are closed and solenoid relay coil 17CR is energized. Upon energization of solenoid relay coil 17CR its relay contacts CR17 (lines 321, 322, 324, 334 and 336) are opened and solenoid relay coils 12MCR, 58CR, 3CR, 18CR, 5CR, and 6CR are de-energized effectively stopping the flow of nails to the coater. Thus, limit switches LS9 and LS 12 operate as safety devices to prevent jamming of the flow of nails in the de-greaser and coater.

Jog switch SW6 is positioned in line 322 and when actuated connects line 323 with line 322. This provides a means for energizing de-whiskerer drum motor solenoid relay coil 58CR, and thereby the drum motor 58. Operation of switch SW6 allows the drum to be rotated fractions of a revolution so that the baffle 53 may be adjusted.

Switch SW7 is positioned in line 338 which connects with lines 336 and 337. It is sometimes desirable to feed the weigh bucket 129 directly from the de-greaser, and bypass the coater 100. When this is desired switch SW7 is actuated and completes line 337 tying in solenoid relay coil CR6 with limit switch LS5 and weight switches SW9 and SW10. Thus, optional scales feed 92 can then be controlled for a regular or dribble feed as can coater scales feed 107. When switch SW7 is positioned so as to complete a circuit through line 338, solenoid relay coil CR6 is not affected by limit switch LS5 and weight switches SW9 and SW10.

Switch SW8 when actuated completes a circuit through line 346 which bypasses timer switch contacts PT3 and provides a means of lowering the skip bucket 154. If the operator for any reason hits the stop switch SW3a and for some reason desired to bring the skip hoist down he closes switch SW8. Thus, the switch is for manual jogging of the skip bucket 154 in the down direction.

Switch SW13 is for manual jogging of skip bucket 154 into the up position only. Upon closing switch SW13 a circuit is completed through lines 350, 348 and part of line 342 energizing the forward winding of motor 160 by energizing solenoid relay coil 160FCR. Thus, if the operator actuates stop switch SW3a and the skip bucket is stopped at a point half way to the dump position the switch SW9 is actuated to raise the bucket to the top so that upon actuation of the start switch SW3 automatic operation may continue.

It is now obvious that the nails which are discharged from the nail forming apparatus, are automatically completely processed and packaged by the automatic nail processor and packager disclosed herein. The nails from the time they leave the nail forming apparatus until they are in the package are never touched by the operator's hand. Thus, it can be seen that nails can be processed and packaged quickly and efficiently by the automatic nail processor and packer disclosed herein. Furthermore, with the magnetic nail aligning means shown herein the nails are packaged in an aligned manner and therefore consume a minimum of packing area.

While there has been described a preferred embodiment of this invention, it will be recognized that various modifications, of this invention may be made within the framework of its principles. Such of these modifications as embody the principles of the invention are to be considered as included in the hereinafter appended claims unless these claims by their language expressly state otherwise.

I claim:

1. An automatic nail processor and nail packager comprising: pre-weigher means for initially weighing the nails; means for feeding nails to said pre-weigher; de-whiskering means for knocking the burrs off from the nails; de-greasing means for de-greasing the nails; coating means for applying a protective coating to the nails; scales means for weighing a predetermined quantity of nails; coater scales feed means for conveying nails from said coater to said scales means, first weight switch means for slowing down said coater scales feed when a set quantity of nails has entered said scale means, and second weight switch means for stopping said coater scales feed when said scales means contains a greater predetermined quantity; magnetic nail packaging means; conveyor means between each of said above mentioned means including said coater scales feed and conveyor means to said pre-weigher means; and electrical circuit means controlling said above mentioned means whereby said nails are automatically processed and packaged.

2. An automatic article processor and packager comprising: pre-weigher means for initially weighing the articles; means for feeding articles to said pre-weigher; de-whiskering means for knocking the burrs off and separating them from the articles; de-greasing means for de-greasing the articles; scales means for weighing a pre-determined quantity of articles; optional scales feed means for conveying articles from said de-greaser to said scales means, first weight switch means for slowing down said optional scales feed when a set quantity of articles has entered said scales means, and second weight switch means for stopping said optional scales feed when said scales means contains a greater predetermined quantity; magnetic article packaging means for packaging magnetizable articles; conveyor means between each of said above mentioned means including said optional scales feed means and to said pre-weigher feed means; and electrical circuit means controlling said above mentioned means whereby said articles are automatically processed and packaged.

3. An automatic article processor and packager as in claim 2 wherein pivotally mounted conveyor means feeds said optional scales feed means, said pivotally mounted conveyor means being readily movable to feed coater means or said scales means, and switch means for rendering said optional scales feed means unresponsive to said first and second weight switch means.

4. An automatic article processor and packager comprising: means for processing the articles; scales means for weighing a predetermined quantity of articles, said scale means having a weigher bucket with article discharging means, scales feed means for conveying articles from said processing means to the weigher bucket; first and second weight switch means for regulating the rate of article flow in said scales feed means, said weigher bucket article discharging means being operable upon actuation of said second weight switch to discharge articles from said weigher bucket; skip hoist means to receive said articles; magnetic article packaging means; said skip hoist means conveying the articles to said magnetic article packager; means for conveying articles to said processing means, and electrical circuit means controlling said above mentioned means whereby said articles are automatically processed and packaged.

5. An automatic article processor and packager as in claim 4 wherein said skip hoist means has a skip bucket; and limit switch means actuated by said skip bucket before said weigher bucket article discharging means becomes operable to discharge articles.

6. An automatic article processor and packager as in claim 4 wherein actuation of said weigher bucket discharging means closes a limit switch which energizes said skip hoist means.

7. An automatic article processor and packager as in claim 4 wherein actuation of said second weight switch de-energizes relay means which stops said scales feed and said processing means.

8. An automatic article processor and packager as in claim 4 wherein there is means for controlling the actuation of said weigher bucket discharging means and the subsequent operation of said skip hoist means.

9. An automatic article processor and packager comprising: means for feeding and processing the articles; scales means for weighing a predetermined quantity of articles; skip hoist means to receive articles from said scales means; magnetic article packaging means, said skip hoist conveying articles from said scales means to said packaging means; conveyor means for bringing empty cartons to said magnetic packaging means; carton advancing and positioning means for placing said carton in said packaging means; limit switch means associated with said advancing cartons to enable said skip to dump said articles only when an empty carton is in said packaging means; lift means for lifting the carton into article receiving position; means for retracting said advancing and positioning means; magnetic means for aligning said articles within said carton, means for lowering the packaged articles, said advancing and positioning means when again extended advancing the packaged articles and positioning an empty carton; and electrical circuit means controlling said above mentioned means whereby said articles are automatically processed and packaged.

10. An automatic article processor and packager comprising: means for processing the articles; scales means for weighing a predetermined quantity of articles, said scales means having a weigher bucket with article discharging means, scales feed means for conveying articles from said processing means to the weigher bucket; first and second weight switch means for regulating the rate of article flow in said scales feed means, said weigher bucket article discharging means being operable upon actuating of said second weigh switch to discharge articles from said weigher bucket; skip hoist means to receive said articles; magnetic article packaging means; said skip hoist means conveying the articles to said magnetic article packager; conveyor means for bringing empty cartons to said magnetic packaging means; carton advancing and positioning means for placing said carton in said packaging means; lift means for lifting the carton into article receiving position, means for retracting said advancing and positioning means; magnetic means for aligning said articles within said carton, means for lowering the packaged articles, said advancing and positioning means when again extended advancing the packaged articles and positioning an empty carton; and electrical circuit means con- 11. An automatic article processor and packager as in claim 10 wherein said advancing and positioning means is actuated by an empty carton hitting a first limit switch means; a second limit switch means tripped by said advancing and positioning means as it extends energizing said lift means; a third limit switch means actuated by said lift means causing said advancing and positioning means to retract; and a fourth limit switch means actuated by said lift means for preventing actuation of said advancing and positioning means when the carton is in article receiving position.

12. An automatic nail processor and packager as in claim 11 wherein a skip hoist limit switch means prevents articles from being dumped into said magnetic article packager unless said first and third limit switch means are closed and said second weight switch means is open.

13. An automatic article processor and packager as in claim 11 wherein said advancing and positioning means is a generally L-shaped member to allow retraction thereof when said lift means hold the carton in article receiving position.

14. An automatic nail processor and nail packager comprising: pre-weigher means for initially weighing the nails; means for feeding nails to said pre-weigher; de-whiskering means for knocking the burrs off from the nails; de-greasing means for de-greasing the nails; limit switch means in said de-greasing means, said limit switch means having a switch actuator being situated to be actuated by an excess flow of articles through said de-greasing means and when actuated shuts down said pre-weigher feed and said de-whiskerer; coating means for applying a protective coating to the nails; additional weighing means for weighing a predetermined quantity of nails; magnetic nail packaging means; conveyor means between each of said above mentioned means; and electrical circuit means controlling said above mentioned means whereby said nails are automatically processed and packaged.

15. An automatic nail processor and nail packager comprising: pre-weigher means for initially weighing the nails; means for feeding nails to said pre-weigher; de-whiskering means for knocking the burrs off from the nails; de-greasing means for de-greasing the nails; coating means for applying a protective coating to the nails; limit switch means in said coater, said coater limit switch means having an actuator situated to be actuated by an excessive flow of nails through the coater and when actuated shuts down said pre-weigher feed, said de-whiskerer, and said de-greaser; additional weighing means for weighing a predetermined quantity of nails; magnetic nail packaging means; conveyor means between each of said above mentioned means; and electrical circuit means controlling said above mentioned means whereby said nails are automatically processed and packaged.

16. A weigher and weigher feed adapted to be used in an automatic article processor and packager comprising: support means; scales means mounted on said support, said scales means having balance mechanism, a weigher bucket suspended from said balance mechanism and having means for discharging articles disposed therein; a conveyor for feeding articles to said weigher bucket, regulating means for operating said conveyor interchangeably at a fast feed and a slow feed for assisting in accurately measuring the quantity of articles fed to said weigher bucket; first trigger means actuated by said scales means to trigger said regulator means and change said conveyor from fast feed to slow feed; and a second trigger means actuated by said scales means for actuating said discharge means and simultaneously stopping said feed means when a predetermined quantity of nails has entered said weigher bucket.

17. A weigher and weigher feed adapted to be used in an automatic article processor and packager as in claim 16 wherein said first trigger means comprising a first weight switch means to control the rate of feed to said weigher bucket and said second trigger means comprises a second weight switch means to energize said article discharge means and stop said article feed; said first and second weight switch means being responsive to the weight in the weigher bucket and being actuated by movement of said scales balance mechanism.

18. A magnetic article packager adapted to be used in an automatic article processor and packager comprising: support means; magnet poles supported by said support means in spaced aligned relationship; means for creating a flux path through said poles; a chute means fixed within said space between said poles and adapted to receive an empty carton and convey articles into said carton; advancing and positioning means for positioning an empty carton transversely of said magnet poles, guide means carried by said poles for positioning a carton longitudinally of the magnetic poles; lift means including a platform for raising said carton to a position surrounding said chute; said advancing and positioning means including a carrier having two parallel guide bars connected by a third bar and forming an openside for receiving a box between the two parallel bars; one of said parallel bars nearest said lift means being shorter than the other permitting it to pass by the lift means when in upward position without interference therewith whereby said bar will guide said box into position on said platform, permit withdrawal of said positioning means to receive another box and push the said box when filled off said platform.

19. A magnetic article packager adapted to be used in an automatic article processor and packager as in claim 18 wherein said advancing and positioning means is guided to move in a horizontal plane by bracket means and guide rod means.

20. A magnetic article packager adapted to be used in an automatic article processor and packager as in claim 19 wherein conveyor means feed empty cartons to said advancing and positioning means; one of said guide rod means having a surface preventing movement of cartons on said conveyor when said advancer and positioner is in extended position.

21. A magnetic article packager adapted to be used in an automatic article processor and packager as in claim 19 wherein said guide rod means have adjustable stop means cooperating with said bracket means for regulating the distance of extent of said advancing and positioning means.

22. The packager defined in claim 18 in which the advancing and positioning means includes a third bar extending from the longer one of said two parallel bars and in a direction away from said lift means thereby forming a stop to prevent boxes from moving into said advancing and positioning means until the two parallel bars are in position for receving a box therebetween.

23. An automatic article processor and article packager comprising: pre-weigher means for initially weighing the articles; means for feeding articles to said pre-weigher, de-whiskering means for knocking the burrs off from the articles and separating the burrs therefrom; de-greasing means for de-greasing the articles; coating means for applying a protective coating to the articles; additional weighing means for weighing a predetermined quantity of articles; magnetic article packaging means; conveyor means between each of said above mentioned means; and electrical circuit means controlling said above mentioned means; limit switch means located in said de-greaser means actuatable by an excess flow of articles therethrough and associated with said electrical means for shutting down the flow of articles to said de-greaser means, and to and from said de-whiskerer means and said pre-weigher means whereby said de-greaser means may rid itself of excess articles.

24. An automatic article processor and article packager comprising: pre-weigher means for initially weighing the articles; means for feeding articles to said pre-weigher, de-whiskering means for knocking the burrs off from the articles and separating the burrs therefrom; de-greasing means for de-greasing the articles; coating means for applying a protective coating to the articles; additional weighing means for weighing a predetermined quantity of articles; magnetic article packaging means; conveyor means between each of said above mentioned means; and electrical circuit means controlling said above mentioned means; limit switch means located in said coater means actuatable by an excess flow of articles therethrough and associated with said electrical means for stopping the flow of articles to said coater means; and the flow of articles to and from said de-greaser means, said de-whiskerer means and said pre-weigher means whereby said coater may rid itself of excess articles.

25. In a processing and packaging apparatus for small metal articles: processing means including at least powered feed conveying means, de-whiskering means, and de-greasing means; weigh scales means; a second powered conveying means for feeding articles from said processing means to said scales means and having at least a low, a high, and a nil feed rate; weigh bucket means on said scale means for retaining articles during weighing, and including bucket dump means; packaging means associated with said weigh bucket means for placing said articles in containers, and packaging conveying means for transferring articles from said weigh bucket means to said packaging means; and switch control means on said scales means; said control means being actuated by the weight of articles in said bucket and being associated with said second powered conveying means to control said feed in relationship to the weight of articles in said bucket.

26. The apparatus in claim 25 wherein said switch control means includes a first weight switch electrically associated with said feed conveying means controlling said feed rate between high and low rates upon the conveying of a first predetermined amount of articles in said bucket, and includes a second weight switch controlling said feed rate between low and nil upon the conveying of a second and greater predetermined amount of articles in said bucket.

27. The apparatus in claim 26 wherein said second switch is also electrically associated with said bucket dump means to activate said dump means upon the conveying of said second predetermined amount of articles in said bucket.

28. The apparatus in claim 27 wherein said second switch is also electrically associated with said powered feed conveying means to deactivate said feed conveying means while said bucket dump means is activated.

References Cited in the file of this patent

UNITED STATES PATENTS

| | | |
|---|---|---|
| 1,249,613 | Gamper | Dec. 11, 1917 |
| 1,367,083 | Otto | Feb. 1, 1921 |
| 1,383,418 | Needham | July 5, 1921 |
| 1,528,887 | Offenhauser | Mar. 10, 1925 |
| 1,537,117 | Hurd | May 12, 1925 |
| 2,390,011 | Thompson | Nov. 27, 1945 |
| 2,503,556 | McCargar | Apr. 11, 1950 |
| 2,523,258 | Ransohoff | Sept. 19, 1950 |
| 2,581,042 | Otto | Jan. 1, 1952 |
| 2,654,465 | Sgriccia | Oct. 6, 1953 |
| 2,703,550 | Bell | Mar. 8, 1955 |
| 2,726,061 | Schieser et al. | Dec. 6, 1955 |
| 2,895,274 | Mumma | July 21, 1959 |
| 2,899,783 | Otto | Aug. 18, 1959 |
| 2,908,122 | Allen | Oct. 13, 1959 |
| 2,916,862 | Otto | Dec. 15, 1959 |
| 2,924,229 | Kearney et al. | Feb. 9, 1960 |
| 2,950,894 | Hillman | Aug. 30, 1960 |